US012712393B2

(12) United States Patent
Agafonov et al.

(10) Patent No.: US 12,712,393 B2
(45) Date of Patent: Aug. 18, 2026

(54) WIRELESS POWER TRANSFER

(71) Applicant: KONINKLIJKE PHILIPS N.V., Eindhoven (NL)

(72) Inventors: Aleksei Agafonov, Eindhoven (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 107 days.

(21) Appl. No.: 18/859,579

(22) PCT Filed: Apr. 25, 2023

(86) PCT No.: PCT/EP2023/060760
§ 371 (c)(1),
(2) Date: Oct. 24, 2024

(87) PCT Pub. No.: WO2023/208901
PCT Pub. Date: Nov. 2, 2023

(65) Prior Publication Data

US 2025/0293546 A1 Sep. 18, 2025

(30) Foreign Application Priority Data

Apr. 28, 2022 (EP) .................................... 22170645

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
USPC .......................................................... 307/104
See application file for complete search history.

(56) References Cited

U.S. PATENT DOCUMENTS 6,014,405 A 1/2000 Garodnick et al.
8,687,674 B1 4/2014 Brocato
8,981,598 B2 * 3/2015 Azancot .................. H04B 5/79 307/104
9,130,395 B2 * 9/2015 Jung ...................... H02J 50/70
9,318,257 B2 * 4/2016 Lou ........................ H01F 38/14
(Continued)

FOREIGN PATENT DOCUMENTS

JP 8316876 H 11/1996
WO 2017171338 A1 10/2017

OTHER PUBLICATIONS

International Search Report and Written Opinion from PCT/EP2023/060760 mailed Jul. 25, 2023.

*Primary Examiner* — Alfonso Perez Borroto

(57) ABSTRACT

A power receiver (105) communicates to a power transmitter (101) using load modulation data symbols modulated by a chip sequence being a combination of two binary sequences. The power transmitter (101) comprises a data receiver (207) which includes a chip determiner (903) determining a received chip sequence and two correlators (905, 907) which correlates this sequence with the two binary sequences. The two correlation results are combined into a single correlation value by a combiner (905). A detector (917) detects a received data symbol value in response to the combined correlation value. The approach may provide improved detection of data symbols and improved communication from the power receiver (105) to the power transmitter (101).

26 Claims, 15 Drawing Sheets

101

(56) References Cited

U.S. PATENT DOCUMENTS 9,331,663 B2 * 5/2016 Suzuki .................... H01F 38/14
2014/0203657 A1 * 7/2014 Song ..................... H02J 50/402
307/104

* cited by examiner

101

105

WIRELESS POWER TRANSFER

CROSS-REFERENCE TO PRIOR APPLICATIONS

This application is the U.S. National Phase application under 35 U.S.C. § 371 of International Application No. PCT/EP2023/060760, filed on Apr. 25, 2023, which claims the benefit of EP Patent Application No. EP 22170645.0, filed on Apr. 28, 2022. These applications are hereby incorporated by reference herein.

FIELD OF THE INVENTION

The invention relates to wireless power transfer and in particular, but not exclusively, to communication in a power transfer system such as the Qi wireless power transfer Specification.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Based on the Qi Specification, an approach known as the Ki specification is being developed for high power application, such as specifically for Kitchen appliances.

In order to support efficient wireless power transfer, wireless power transfer systems, such as Qi based systems, utilize substantial communication between the power transmitter and the power receiver. Initially. Qi supported only communication from the power receiver to the power transmitter using load modulation of the power transfer signal. Thus, initial Qi devices support only unidirectional communication from the power receiver to the power transmitter.

However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging.

It has also been found in practice that load modulation may result in the introduction of undesired spurious oscillations to the drive signal and the power transfer signal. The power transfer path in a wireless power transfer system tends to include a significant amount of inductance and tends to have a resonant behavior. As such load modulation tends to affect the power transfer path and indeed the communication path. Thus, the load modulation also results in noise and interference to the communication itself (self interference). This differs substantially from other communication systems where random noise or interference from other transmissions are the main causes of bit errors.

Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

In some cases, load modulation communication as e.g. used in the initial versions of the Qi Specifications may not have perfect reliability and some bit errors may possibly occur in some cases. For example, high levels of noise or self-interference may result in bit errors and/or may require an increased modulation depth which may result in increased electrical or acoustic noise resulting from the load modulation.

Although it may in some ways be desired to change to a different communication approach, maintaining backwards compatibility or reducing the amount of change needed for existing designs and approaches is a prime challenge that often renders this unattractive.

Hence, an improved approach would be advantageous, in particular, an approach allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a power transmitter for wirelessly providing power to a power receiver via an electromagnetic power transfer signal, the power transmitter comprising: an output circuit comprising a transmitter coil arranged to generate the power transfer signal in response to a drive signal being applied to the output circuit; a driver arranged to generate the drive signal; and a data receiver arranged to receive load modulation data symbols modulated by at least one modulation chip sequence, at least a first modulation chip sequence of the at least one modulation chip sequences being a combination of a first binary chip sequence and a second binary chip sequence; wherein the receiver comprises: a load measurer arranged to measure loading of the power transfer signal to generate measured load values; a chip determiner arranged to determine a received chip sequence from the measured load values; a first correlator arranged to correlate the received chip sequence with the first binary chip sequence to generate a first correlation value; a second correlator arranged to correlate the received chip sequence with the second binary chip sequence to generate a second correlation value; a combiner arranged to generate a combined correlation value as a function of the first correlation value and the second correlation value; a detector is arranged to detect a received data symbol value in response to the combined correlation value.

The invention may allow improved performance in many embodiments and may in particular in many embodiments allow improved communication between a power receiver and a power transmitter. It may allow improved power transfer in many embodiments.

The approach may allow improved communication, and in many embodiments may allow improved trade-off between different parameters and operating characteristics. The approach may e.g. allow highly reliable communication yet allow reduced modulation depth to be used. The approach may reduce electric noise and/or electromagnetic interference and allow improved electromagnetic compatibility. The approach may in many cases reduce or prevent acoustic noise. Further, the approach may provide advantageous backwards compatibility and e.g. may allow relatively easy modification of existing approaches, such as those used by the Qi or Ki Specifications. The approach may often reuse much functionality from such existing approaches. The approach may allow a low complexity implementation yet provide highly efficient performance. The communication approach may be particularly advantageous for use in power transfer systems as bandwidth considerations may be less critical in such systems.

The approach may in many scenarios allow an improved trade-off between different parameters including computational resource requirements, data detection accuracy, bit error rate, data rate etc.

The approach may in many embodiments allow improved and/or facilitated detection of load modulation data at the power transmitter.

In many scenarios, a reduced sensitivity to temporal variations, noise, distortion and in particular self-interference etc. can be achieved for the communication of data from a power receiver to a power transmitter.

A chip sequence may be a sequence/pattern of chip values. Each chip value may be represented by a load modulation level or pattern of such. Chip sequences for different data symbols have different sequences/patterns of chip values. The first binary chip sequence and the second binary chip sequence may be different chip sequences. The combined correlation value may be monotonically increasing for the first correlation value and monotonically increasing for the second correlation value. The combined correlation value may increase for an increasing value of the first correlation value and increase for an increasing value of the second correlation value. In some embodiments, the combined correlation value may be a weighted combination/summation/multiplication of the first correlation value and the second correlation value. The weights for both the first correlation value and the second correlation value may be positive. Each modulation chip sequence may represent one data symbol.

In many embodiments, the length of the chip sequences is not below 10 and not above 1024 chips.

The measured load values may be samples of a signal indicative of the load of the power transfer signal. The measured load values may be samples of a parameter of the drive signal.

The load measurer may be arranged to measure a loading/load of the power transfer signal (specifically by the power receiver) to determine measured load values for load time intervals. The function for generating the combined correlation value may be monotonically increasing for both the first and the second correlation value. The first and second binary sequence may have the same length, and may have the same length as the modulation chip sequence.

The correlators may be arranged to generate a correlation value for different, and possibly all, chip alignments between the received chip sequence and the first and second binary sequence. The detector and possibly the combiner may in such cases process correlation values corresponding to peak correlations. In some embodiments, the correlation values are correlation values for the first and second binary sequences being aligned with the modulation chip sequence/received chip sequence, the alignment may for example be determined by a peak detection of the correlations.

In accordance with an optional feature of the invention, the first modulation chip sequence comprises at least three different chip values.

This may provide improved performance in many embodiments. In many scenarios, it may provide improved information relating to the modulation chip sequence and how this relates to the first and second binary sequences thereby providing additional symbol detection.

In accordance with an optional feature of the invention, at least two chip values of the first modulation chip sequence are represented by modulation load changes, the modulation load changes being different for the at least two chip values; and the chip determiner is arranged to determine the received chip sequence in response to modulation load changes.

The approach may in many embodiments allow improved and/or facilitated detection of load modulation data at the power transmitter. It may in many scenarios reduce or remove the need to determine average or nominal load reference levels in order to detect modulation load levels and variations. For example, chip values can in many embodiments be determined considering only modulation load values within the chip itself.

In many scenarios, the load modulation for an individual chip may not only indicate the chip value but may also provide a reference load value for the determination of the chip value.

In accordance with an optional feature of the invention, each of chip time interval of the first modulation chip sequence is divided into at least two load time intervals, at least two chip values having different modulation loads for the at least two load time intervals, a pattern of modulation loads being different for different chip values of the at least two chip values, and a third chip value of the at least three different chip values having a same modulation load in the at least two load time intervals; and the load measurer is arranged to determine the measured load values as measured load values for load time intervals; and the chip determiner is arranged to determine chip values for the received chip sequence in response to differences in measured load values for different load time intervals of each chip.

This may allow improved and/or facilitated detection of load modulation data at the power transmitter.

In some embodiments, the load measurer is arranged to synchronize measurement of the load of the power transfer signal to cycles of the power transfer signal.

This may allow improved performance and/or facilitated operation and/or reduced complexity. It may in particular allow an improved and/or facilitated determination of suitable load values for data symbol detection.

In some embodiments, each load time interval has a duration of one cycle of the power transfer signal.

This may allow improved performance and/or facilitated operation and/or reduced complexity. It may in many scenarios allow increased data rate.

In some embodiments, each load time interval has a duration of a plurality cycles of the power transfer signal.

This may allow improved performance and/or facilitated operation and/or reduced complexity. It may in some embodiments, provide reduced sensitivity to synchronization errors. In some embodiments, the load measurer is arranged to perform a single load measurement per load time interval.

This may allow improved performance and/or facilitated operation and/or reduced complexity.

In some embodiments, the chip determiner is arranged to determine a binary chip value for a chip as a function of a sign of the difference between measured load value for two modulation load time intervals for the chip.

This may allow improved performance and/or facilitated operation and/or reduced complexity.

In some embodiments, the chip determiner is arranged to determine the received chip sequence to comprise soft-decision chip values in response to a magnitude of the difference between measured load values for two modulation load time intervals for the chips, and the correlators are arranged to perform the correlation with respectively the first and second binary chip sequences in response to the soft-decision chip values.

This may allow improved performance and/or facilitated operation and/or reduced complexity.

In accordance with an optional feature of the invention, the first modulation chip sequence comprises three different chip values.

This may allow particularly advantageous operation and/or performance in many embodiments.

In accordance with an optional feature of the invention, the first modulation chip sequence has a first value for aligned chips of the first binary sequence and the second binary sequence both having a first binary value, a second value for aligned chips of the first binary sequence and the second binary sequence both having a second binary value; and a third value for aligned chips of the first binary sequence and the second binary sequence having different aligned values.

This may allow particularly advantageous operation and/or performance in many embodiments. Aligned chips may be chips at the same sequential position in the respective sequences.

In accordance with an optional feature of the invention, the chip determiner is arranged to determine the received chip sequence as a binary chip sequence.

This may allow particularly advantageous operation and/or performance in many embodiments. It may in many embodiments allow efficient and/or low complexity implementation. It may for example allow binary correlation. However, despite representing a possibly non-binary modulation chip sequence by a binary received chip sequence, the approach allows for very accurate data symbol detection.

In accordance with an optional feature of the invention, the chip determiner and the first correlator are arranged such that a contribution to the first correlation value for at least one chip value of the first modulation chip sequence is less than 10% of a contribution to the first correlation value for at least one other chip value of the modulation chip sequence.

This may allow particularly advantageous operation and/or performance in many embodiments.

In accordance with an optional feature of the invention, the combiner is arranged to generate a combined correlation value in response to a multiplication of the first correlation value and the second correlation value.

This may allow particularly advantageous operation and/or performance in many embodiments.

In accordance with an optional feature of the invention, the chip determiner is arranged to determine the received chip sequence to have chip values that are possible chip values for the first modulation chip sequence.

This may allow particularly advantageous operation and/or performance in many embodiments.

In accordance with an optional feature of the invention, a cross-correlation of the first binary sequence and the first modulation chip sequence is no less than two thirds of a length of the first binary sequence when the first binary sequence and the first modulation chip sequence are aligned, and no more than one third of the length of the first binary sequence when the first binary sequence and the first modulation chip sequence are not aligned.

According to an aspect of the invention there is provided a power receiver for wirelessly receiving power from a power transmitter via an electromagnetic power transfer signal, the power receiver comprising: an input circuit comprising a receiver coil arranged to extract power from the power transfer signal; a data transmitter arranged to transmit data symbols to the power transmitter by load modulating the power transfer signal, each data symbol being modulated by a sequence of modulation load values corresponding to a chip sequence of a set of modulation chip sequences, chip sequences of the set of chip sequences being linked to different data symbol values; wherein at least one modulation chip sequence of set of modulation chip sequences is a combination of a first binary chip sequence and a second binary chip sequence and has at least three different chip values.

According to an aspect of the invention there is provided a method of operation for a power transmitter wirelessly providing power to a power receiver via an electromagnetic power transfer signal, the power transmitter comprising: an output circuit comprising a transmitter coil arranged to generate the power transfer signal in response to a drive signal being applied to the output circuit; a driver arranged to generate the drive signal; and a data receiver arranged to receive load modulation data symbols modulated by at least one modulation chip sequence, at least a first modulation chip sequence of the at least one modulation chip sequences being a combination of a first binary chip sequence and a second binary chip sequence; wherein the method comprising the receiver performing the steps of: measuring loading of the power transfer signal to generate measured load values; determining a received chip sequence from the measured load values; correlating the received chip sequence with the first binary chip sequence to generate a first correlation value; correlating the received chip sequence with the second binary chip sequence to generate a second correlation value; generating a combined correlation value as a function of the first correlation value and the second correlation value; detecting a received data symbol value in response to the combined correlation value.

According to an aspect of the invention there is provided a method of operation for a power receiver wirelessly receiving power from a power transmitter via an electromagnetic power transfer signal, the power receiver comprising: an input circuit comprising a receiver coil arranged to extract power from the power transfer signal; and the method comprising: a data transmitter transmitting data symbols to the power transmitter by load modulating the power transfer signal, each data symbol being modulated by a sequence of modulation load values corresponding to a chip sequence of a set of modulation chip sequences, chip sequences of the set of chip sequences being linked to different data symbol values; wherein at least one modulation chip sequence of set of modulation chip sequences is a combination of a first binary chip sequence and a second binary chip sequence and has at least three different chip values.

According to an aspect of the invention there is provided a method of operation for a power receiver.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a high power wireless power transfer system utilizing a power transfer approach such as known from the Qi Specification or the Ki Specification. However, it will be appreciated that the invention is not limited to this application but may be applied to many other wireless power transfer systems.

Figure 1:
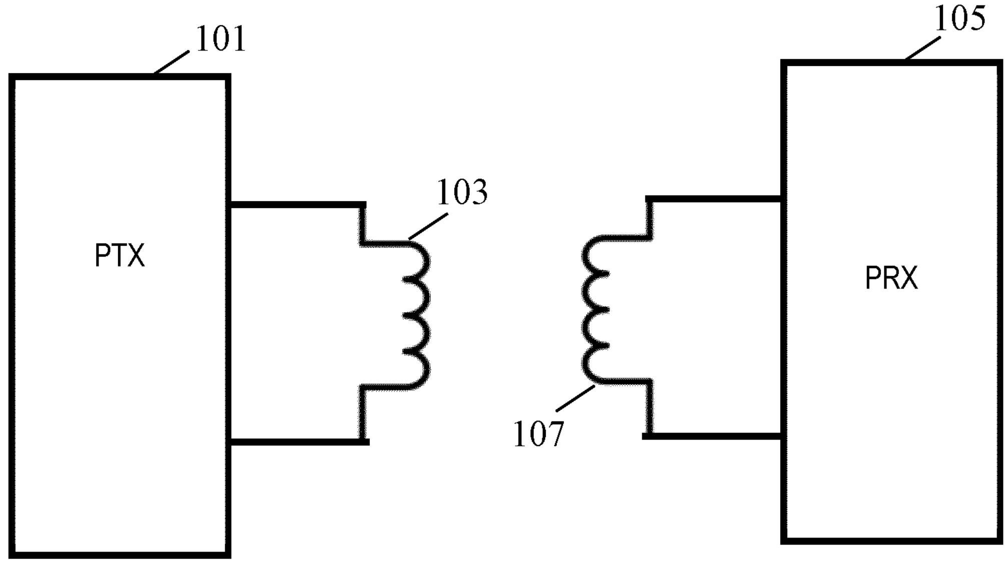
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and in many practical systems may be around 120-150 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi or Ki Specifications (except for the herein described (or consequential) modifications and enhancements).

Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
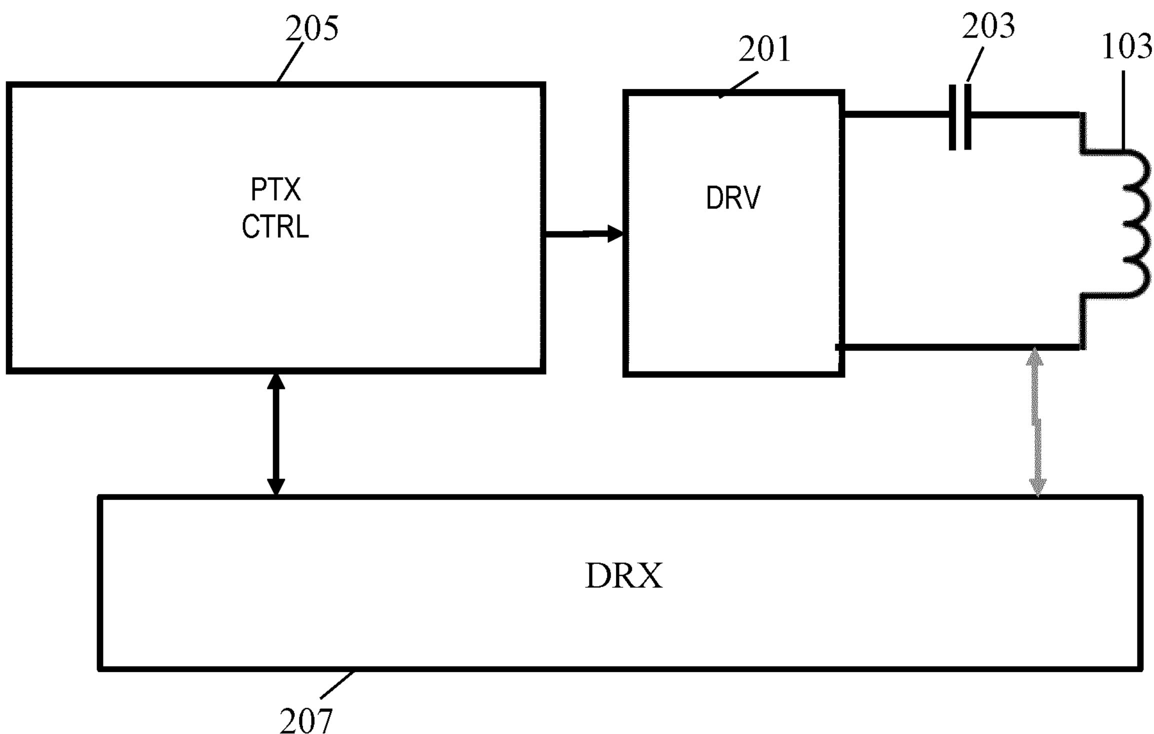
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
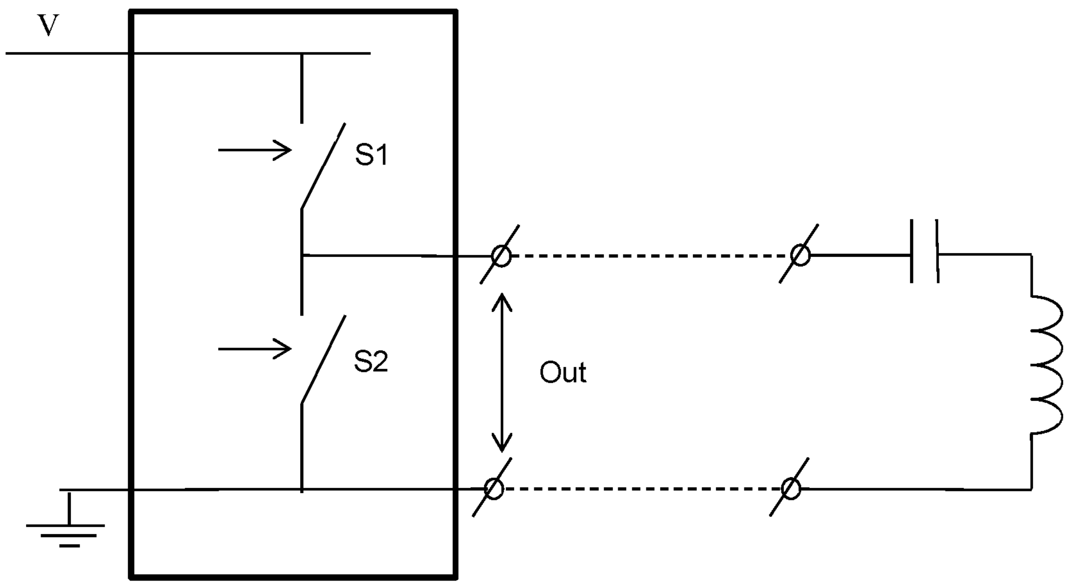
FIG. 3 illustrates an example of a half bridge inverter for a power transmitter.
Figure 4:
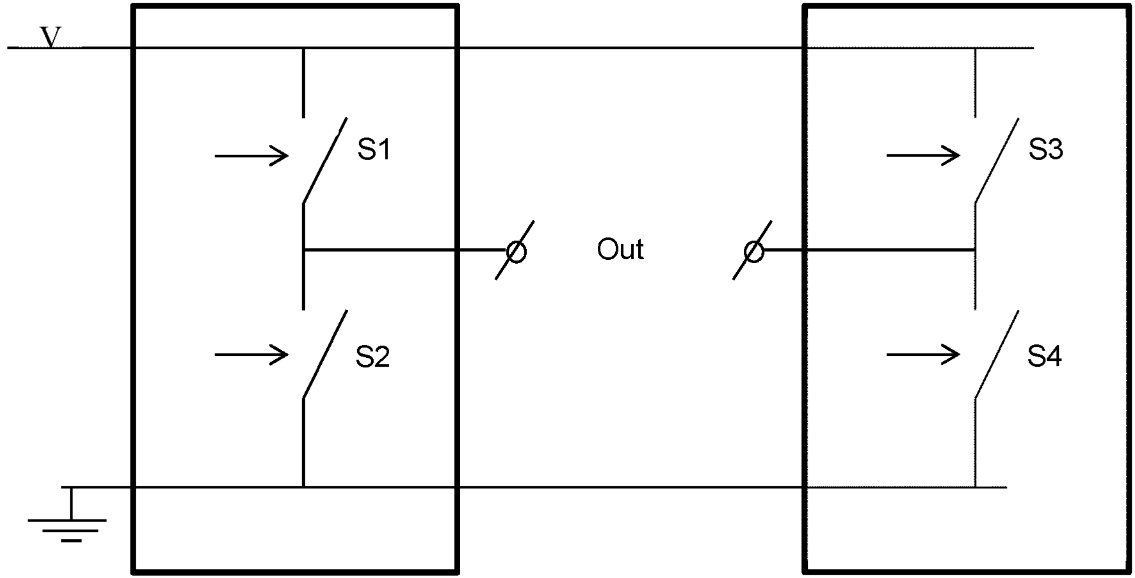
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi or Ki Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

Figure 5:
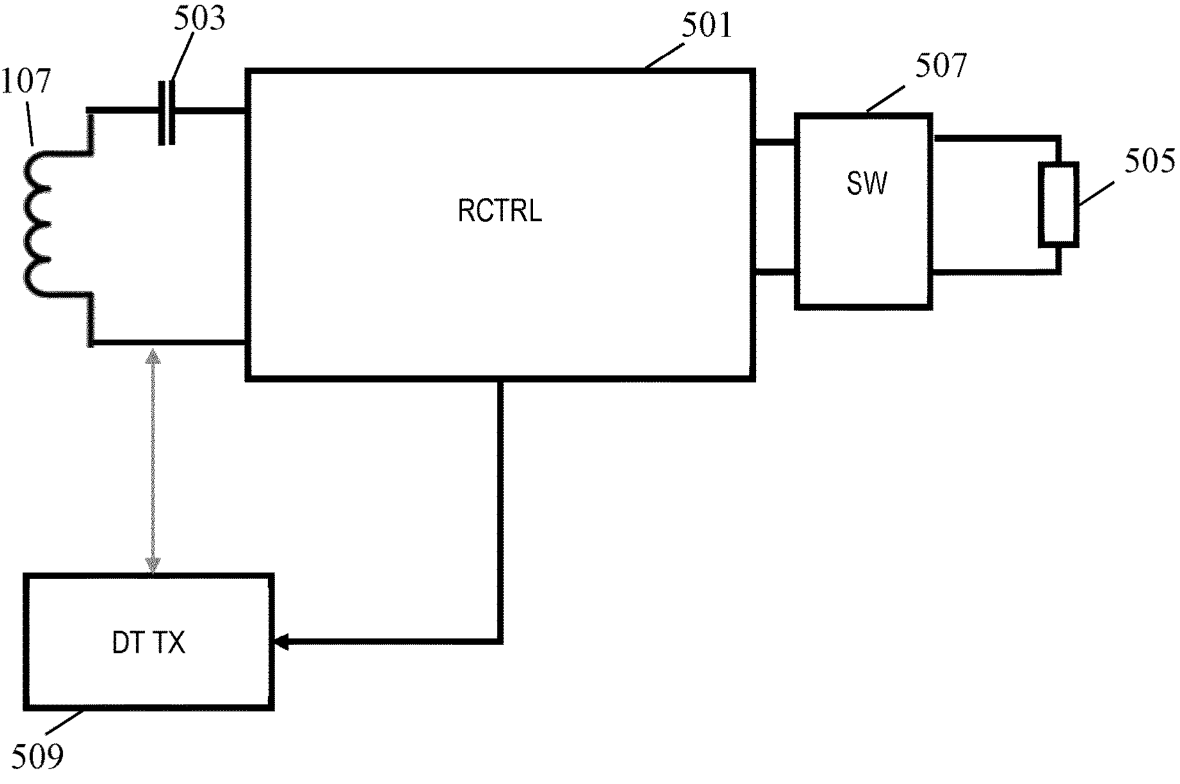
FIG. 5 illustrates an example of elements of a power receiver in accordance with some embodiments of the invention.

FIG. 5 illustrates some exemplary elements of the power receiver 105.

In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi or Ki Specifications.

The power receiver 105 is arranged to transmit data to the power transmitter 101. Such data may specifically include power control loop error messages used to implement a feedback power loop for controlling the power level of the power transfer signal during power transfer as will be known to the skilled person. The power receiver may in many embodiments be capable of transmitting a range of different messages serving different purposes as known to the skilled person. For example, a range of different messages such as those specified in the Qi Specifications may be transmitted. Messages may comprise one or more data bits/symbols.

The power receiver is arranged to transmit messages to the power transmitter using load modulation.

As will be well known to the skilled person, for load modulation, changes in the loading of the power transfer signal may be introduced by the power receiver where the changes are in accordance with data values to be transmitted. These changes can then be detected by the power transmitter in order to decode the data from the power receiver.

Load modulation may be used as the method for the power receiver to communicate control messages, or other data, to the power transmitter in accordance with e.g. the Qi wireless power standard.

There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal.

Correspondingly, at the power transmitter, detection approaches such as those known for Qi Specification systems may be used to detect the load variations. For example, a direct measurement of a power level or current amplitude of the drive signal may be used as indications of the loading, and thus of the load modulation variations introduced by the power receiver.

The power receiver 105 comprises a data transmitter 509 which is arranged to transmit data to the power transmitter 101 by load modulating the power transfer signal. For example, the data transmitter 509 may be arranged to switch in/out a communication capacitor (or other impedance) e.g. positioned in parallel with the power receiver controller 501 or with the resonance capacitor 503 thereby being able to vary the resonance frequency and the loading of the power transfer signal.

The data transmitter 509 may be coupled to the power receiver controller 501 and may be arranged to receive data from the power receiver controller 501 for transmission to the power transmitter. For example, the data transmitter 509 may receive power error control data from the power receiver controller 501 and may transmit corresponding power error control messages to the power transmitter 101 using load modulation. In operation, the system is typically arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

The data transmitter 509 is arranged to transmit data symbols by load modulating the power transfer signal by a sequence of modulation load values corresponding to a chip sequence. The data transmitter 509 may transmit the data symbols using an approach that e.g. similarly to a Direct Sequence Spread Spectrum (DSSS) uses a chip sequence to modulate the data symbols. The data symbols/bits are modulated by a (typically pseudorandom) bit sequence also referred to as a spreading sequence. Each spreading-sequence bit, which is known as a chip, has a much shorter duration (larger bandwidth) than the original message bits.

In the approach, load modulation is employed, but each symbol is represented by a chip sequence comprising a plurality of chips, and typically with a sequence comprising 10 to 1023 chips.

Thus, rather than simply varying the load in accordance with each symbol or bit, the data transmitter 509 is arranged to transmit a given symbol (typically a bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

Similarly, as will be described in more detail later, the power transmitter may detect the load modulation by considering the whole chip sequence, and specifically may seek to determine the received symbol as the one for which the measured load variation chip pattern most closely matches the chip sequence pattern for that symbol.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

Figure 6:
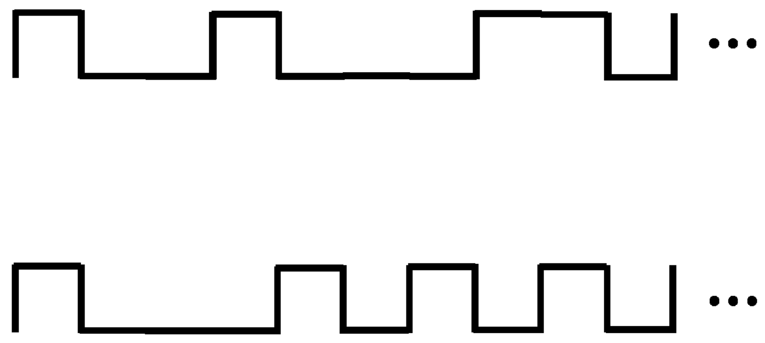
FIG. 6 illustrates an example of chip sequences.

Conventionally, such communication uses binary sequences such as e.g. the exemplary chip sequences illustrated in FIG. 6 illustrates an example of parts of two possible chip sequences. Each chip sequence comprises a sequence of chips. Conventionally, the set of chip values is two, corresponding to a binary chip sequence. However, as will be described in more detail later, the current approach may in many embodiments use a (t least one) modulation chip sequence with non-binary chip levels. In many embodiments, the chips may have one of three different chip levels, and the chip sequence includes three different chip levels. The following description will focus on such an example but it will be appreciated that in other embodiments a binary chip sequence may be used or indeed chip sequences with four or more possible levels may be used.

A symbol time is in the described approach divided into a plurality of chip intervals with the chip sequences of the chips being different for different data symbols. Typically, each sequence includes at least ten chips, and often substantially more. In many embodiments, each chip sequence may have a length of $2^N$-1 where N is an integer of typically no less than 4.

Each possible data symbol value may be linked/represented by one modulation chip sequence. Thus, for a given data symbol value to be transmitted, the corresponding/linked modulation chip sequence is determined and modulated on to the power transfer signal by load modulation. For example, where only two data symbols are possible, i.e. where a binary communication is implemented, the set of chip sequences may comprise only two chip sequences.

In many embodiments, the one or more chip sequences may be represented by a relationship to another chip sequence. For example, for binary communication, the data transmitter 509 may store a single modulation chip sequence corresponding to one of the binary data values. The chip sequence for the other binary data value may be represented by the same stored bit sequence as it may be given as the inverse of the stored bit sequence. Thus, often the set of chip sequences utilizes complementary inverse chip sequences for pairs of data symbols and therefore only half of the used chip sequences are typically explicitly stored/determined in the data transmitter 509 with the remaining chip sequences being automatically and implicitly stored/determined as the inverse of these.

Thus, in some embodiments, the modulation chip sequences may include inverse chip sequences. Equivalently, the same modulation chip sequence can be considered to represent two data symbol values, and specifically two binary data symbol values.

The modulation chip sequence is for a given data symbol to be transmitted selected from a set of modulation chip sequences, and in the example the data transmitter 509 provides a set of modulation chip sequences with each chip sequence being linked to a data symbol value. Typically, the set of modulation chip sequences comprises a chip sequence for each possible data symbol value. For example, if binary communication is used, the first set of chip sequences may comprise only two chip sequences. It will be appreciated that the data transmitter 509 may store the chip sequences in any suitable form and does not need to store a full sequence for each possible data symbol. For example, a given modulation chip sequence may be multiplied by a binary symbol value represented by the values 1, −1. At the receiving end, i.e. that the power transmitter, the data value may then be determined by a correlation with the given modulation chip sequence and a determination of the corresponding binary data value dependent on whether this is a positive or negative correlation.

In many embodiments, binary communication may accordingly be used where only two data symbol values are possible (corresponding to a "0" bit value or a "1" bit value). In such cases, one bit value may be represented by a given chip sequence and the other bit value may be associated with the inverse bit sequence, i.e. the bit sequence that results from changing each chip value to the opposite value. The two bit sequences are thus typically complementary with one resulting from the other by multiplication by −1 (with the chip values being represented by +1 and −1).

A particular advantage in such a case is that demodulation is particularly easy as a single correlation can be used to differentiate between bit values as the magnitude of the correlation is the same for the chip sequences, but the signs of the correlation values are opposite.

It will be appreciated that it is equivalent to consider data symbols represented by inverse modulation chip sequences to be represented by one chip sequence or by two chip sequences. It will be appreciated that such a binary approach with two inverse chip sequences being used is equivalent to considering that the two possible binary values are modulated by the same chip sequence but with the data symbols having opposite data values (e.g. +1 and −1).

When the power receiver 105 is about to transmit a data symbol, the value is fed to the data transmitter 509 from the power receiver controller 501 which proceeds to determine the chip sequence that is linked to the data symbol value to be transmitted.

The data transmitter 509 is arranged to modulate the chip sequence onto the power transfer signal. Specifically, a modulation load may be switched in and out (on/off) in line with the chips. i.e. the load may be changed in accordance with the modulation load values of the chip sequence.

The chip sequences in the set are typically (but not necessarily) of the same length. For binary communication, the set of chip sequences may as mentioned include only a single modulation chip sequence (or equivalently two inverse chip sequences). The following description will focus on such binary communication, but it will be appreciated that the invention is not limited to only binary communication.

Load modulation may provide advantageous operation in many systems and applications and tends to provide reliable and low complexity operation suitable for power transfer systems where a power transfer signal is generated for the purpose of transferring power. The reuse of the power transfer signal as a communication carrier may typically reduce complexity and require less circuitry thereby reducing cost. The Qi Specifications were originally implemented with unilateral communication from the power receiver to the power transmitter by using a load modulation with a modulation symbol shape that allowed easy differentiation between binary data values.

However, load modulation as used in e.g. Qi systems may also have some associated disadvantages. Such disadvantages may e.g. be related to issues such as electromagnetic compatibility, communication quality (bit error rate), and audible noise.

The load modulation may create additional components in the electromagnetic spectrum causing additional electromagnetic interference and electrical noise. Thus, in contrast to more conventional communication systems where noise and interference is typically unrelated or independent noise caused by other noise or interference sources, the load modulation in a power transfer system tends to result in significant amount of self-interference. In particular, the power transfer path includes substantial inductance and resonances which cause load variations to result in oscillations and other interfering components. In contrast to conventional systems, the interference is thus not independent or random noise and interference but tends to include components correlated to the actual modulation.

Also, it has been found that in many cases, the changes to the electromagnetic field caused by the load modulation may cause mechanical forces and movement that result in audible noise. It has also been found that strong load modulation may disturb the energy balance in the wireless power system, resulting in spurious oscillations within the communication carrier spectrum. In the presence of spurious oscillations, the wireless power transmitter often cannot properly demodulate the signal and therefore it has to interrupt power delivery to maintain safe operations.

A number of challenges accordingly exist for communication in a wireless power transfer system.

The problems tend to be exacerbated for higher power transfer levels. Indeed, as the power levels of the power transfer signal increase, it is typically required that the load change for load modulation increases as well. Typically, the load modulation is required to be a suitable fraction of the power level, or maximum power level, of the power transfer signal. For example, the load modulation caused by the load modulation may be required to have a magnitude of no less than e.g. about 1% of the general loading of the power receiver (i.e. the load variation for the receiver coil caused by the load modulation may be required to be no less than 1% of the total load of the receiver coil 107). Qi was originally introduced for lower power applications of less than 5 W or so. For such lower power levels, the impact of the load modulation disadvantages is relatively manageable or even substantially insignificant. However, the maximum power levels for Qi have been increased to currently a maximum value of 15 W and work is ongoing to increase this further to a maximum level of 45 W. However, for such power levels, the above mentioned disadvantages tend to be significant, and they may provide a major obstacle to the further development of the Qi Specifications.

Figure 7:
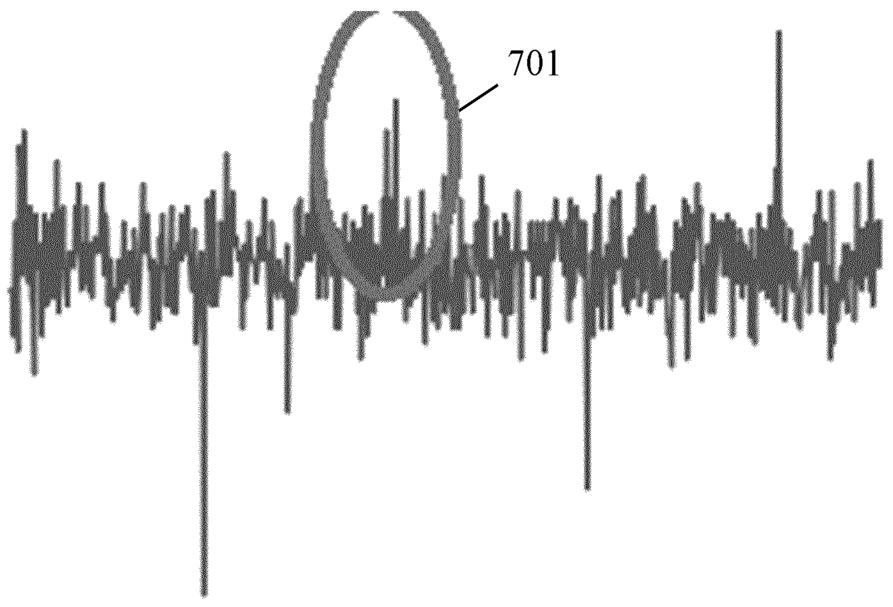
FIG. 7 illustrates an example of a correlation value for load communication in a wireless power transfer system.

Although chip sequence based load modulation communication provides substantial advantages, and in particular allows a reduction in the modulation depth of load modulation, current approaches tend to not provide ideal performance. Indeed, lowering the modulation depth in some cases may reduce the detection accuracy and increase the bit error rate. Interference, and specifically self-interference of the load modulation may result in in data symbols not being accurately detected. In some cases, the correlations performed at the data receiver may due to the interference not be correctly detected. For example, FIG. 7 illustrates an example of a correlator output between a received load sequence and modulation chip sequence used for modulating the power transfer signal. The correlation peaks are reduced due to interference, and noise and in the example peak 701 will not be accurately detected.

Such issues, and others, may in many scenarios be addressed and mitigated by the approach used by the wireless power transfer system of FIGS. 1, 2, and 5.

In the approach, a modulation chip sequence (in many embodiments with three or more levels) is generated by combining a first and second binary chip sequence. The data symbols, and specifically the bits, to be transmitted are then encoded, typically multiplied, by this (often three (or more) level) modulation chip sequence. The resulting sequence is then modulated onto the power transfer signal. In the approach, the data symbols are thus encoded using at least one modulation chip sequence that is a combination of a first binary chip sequence and a second binary chip sequence and which in many embodiments has at least three different chip values. Different data symbols may be associated with different modulation chip sequences and thus with different first and/or second binary sequences.

At the data receiving function of the power transmitter, a received load sequence is then not correlated directly with the (e.g. three level) modulation chip sequence but rather two correlations are performed, namely with respectively the first chip sequence and the second chip sequence. The two resulting correlation values are then combined into a combined correlation value, e.g. by multiplying the two correlation values, and the data symbol is detected based on the resulting combined correlation value. The approach will be described in more detail with reference to FIGS. 8 and 9.

Figure 8:
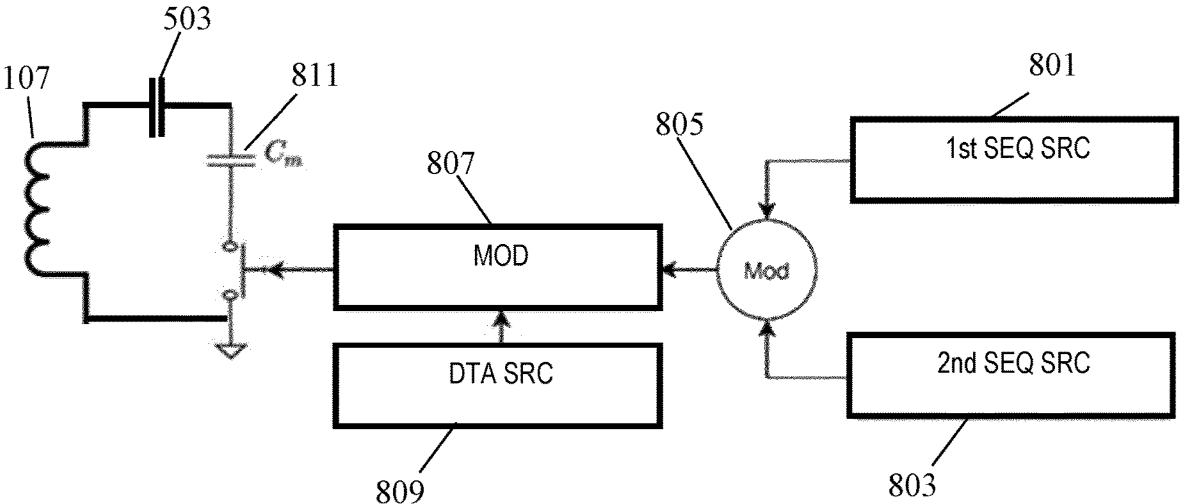
FIG. 8 illustrates an example of elements of a power receiver in accordance with some embodiments of the invention.

FIG. 8 illustrates elements of the data transmitter 509. The data transmitter 509 of the example comprises a first sequence source 801 and a second sequence source 803. Each of the first and the second sequence sources 801, 803 provide a binary chip sequence to a combiner 805 which combines the binary sequences into a modulation chip sequence. In many embodiments, the modulation chip sequence is generated as a three level modulation chip sequence.

The first and second binary chip sequences are in many embodiments selected to be of the same length, i.e. to comprise the same number of chips. Further, the combination is typically performed on a chip basis and the combined modulation chip sequence has the same length/number of chips as the original chip sequences.

The length of the chip sequences may, as previously mentioned, often include at least ten chips, and often substantially more. In many embodiments, each chip sequence may have a length of $2^N$-1 where N is an integer of typically no less than 4.

The first and second binary chip sequences are typically selected to provide improved detection and communication properties by being selected to have a relatively high cross-correlation when the binary sequences are aligned in time/sequence, i.e. for a given offset of typically zero, but with a low cross-correlation value when not aligned, i.e. for other time/sequence offsets.

The combination is further such that the correlation values to the modulation chip sequence maintains a relatively high cross-correlation with at least one but typically both of the first and second binary chip sequences, when the sequences are aligned with the modulation chip sequence but a relatively low cross-correlation when not aligned.

Figure 10:
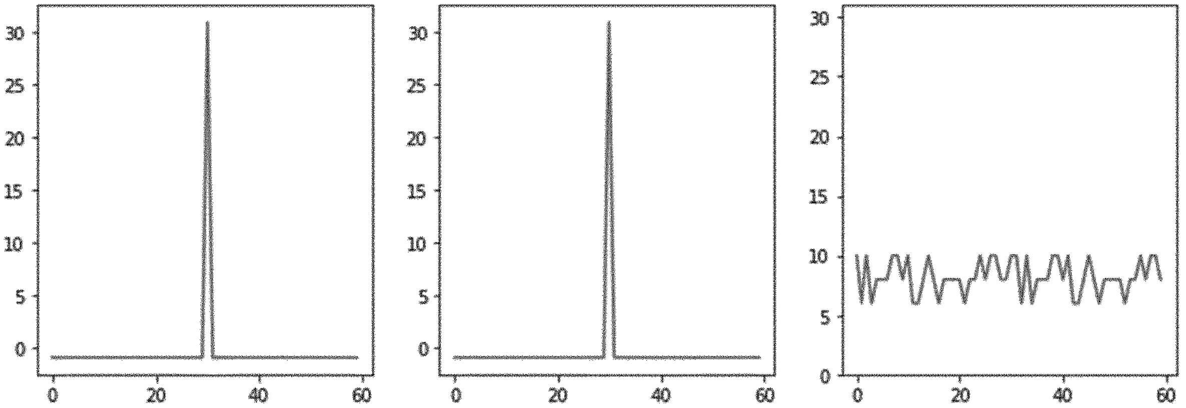
FIG. 10 illustrates an example of simulation results for load modulation communication in a wireless power transfer system.

In particular, the first and second binary chip sequences and the combination are designed such that the cross-correlation of the first and/or second binary sequence and the modulation chip sequence is no less than two thirds of a length of the first and/or second binary sequence when the first binary sequence and the modulation chip sequence are aligned but no more than one third of the length of the first and/or secondary binary sequence when this and the modulation chip sequence are not aligned. For example, the first sequence source 801 may provide a $5^{th}$ order first binary chip sequence based on the polynomial $x^5+x^2+1$, containing a set of 31 chips, representable as −1 and 1. At the same time, the second sequence source 803 may generate a $5^{th}$ order second binary sequence using a different polynomial, e.g. $x^5+x^4+x^3+x^2+1$, containing a set of another 31 chips, representable as −1 and 1. The autocorrelation functions and cross-correlation functions of these sequences are illustrated in FIG. 10.

The combination by the combiner 805 may use different approaches in different embodiments to generate the three level (or higher) modulation chip sequence. Typically, a chip by chip based combination is performed.

As a specific example, the first and second binary chip sequences may be represented by the values −1 and 1 and the combination may follow the following rules for generating a combined modulation chip sequence wherein the chips are represented by three possible values (−1, 0, 1):

If both binary sequences in the same position have a chip value of 1, the resulting modulation chip sequence is set to a value of 1 in the corresponding position.

If both binary sequences in the same position have a chip value of −1, the resulting modulation chip sequence is set to a value of −1 in the corresponding position.

If both sequences have different values (−1 and 1) in the same position, the resulting modulation chip sequence is set to the value of 0.

Figure 11:
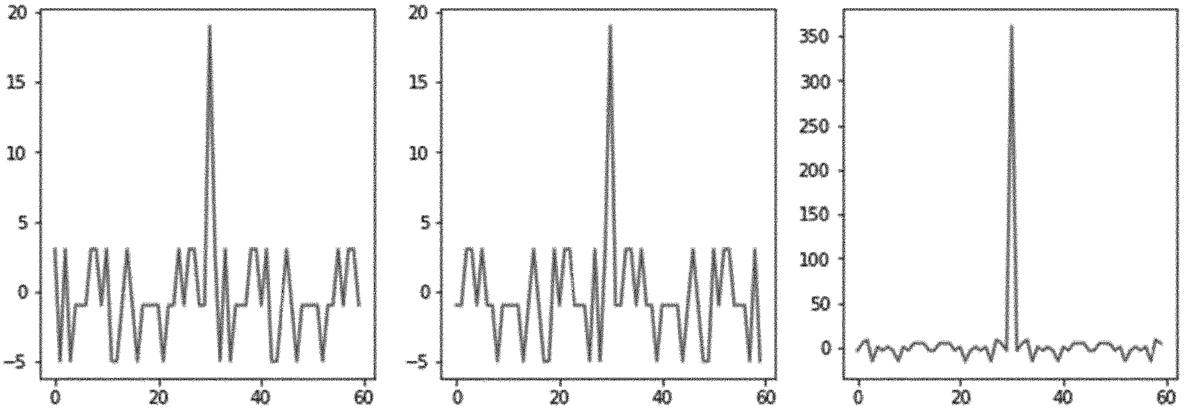
FIG. 11 illustrates an example of simulation results for load modulation communication in a wireless power transfer system.

Applying these rules to the first and second binary chip sequences results in a three-state modulation chip sequence. Further, significantly, the resulting sequence strongly correlates with both of the first and second binary chip sequences. FIG. 11 illustrates cross-correlation between each of the first and second binary chip sequences and the resulting modulation chip sequence. FIG. 11 further illustrates the result of multiplying the two individual cross-correlations. As can be seen, correlation peak is much clearer and well defined for the multiplied result. In particular, it reflects that the stochastic local maxima (minima) are not aligned for individual cross-correlation functions (between modulation sequence and the first or second binary chip sequences). Thus, multiplication of correlation results allows an improved detection of the correlation peak.

The modulation chip sequence is fed to a modulator 807 which is further coupled to a data source 809. The data source provides the data symbols to be transmitted and the modulator then generates the corresponding chip sequence and controls the modulation of the chip sequence onto the power transfer signal.

In the specific example, the data symbols may be binary data symbols that are represented by the values of −1 and 1 and the chip sequence to be modulated onto the power transfer signal may be generated by multiplying the modulation chip sequence (represented by the (−1, 0, 1) levels/values) and the data symbol value. Other approaches may be used in other embodiments. For example, for each data symbol value, a stored modulation chip sequence linked to that data symbol (generated as a combination of two binary sequences) is retrieved and modulated onto the power transfer signal.

In the example, the chip sequence is modulated onto the power transfer signal by modifying a modulation capacitance 811 of the power transmitter input resonance circuit. In the example, a capacitor may for example be switched in/out of the resonance circuit depending on the chip values. It will be appreciated that since the modulation chip sequence in many embodiments comprises three (or more) levels, the load variation for a given chip may be represented by three (or more) load variations. In many cases, the modulator 807 may switch the capacitance between three different levels (e.g. using two different modulation capacitors and two switches). In some embodiments, a different modulation of each chip may be used where the modulation load may change within a chip depending on the chip value and accordingly more values can be represented using e.g. a simple binary switching of a load/modulation capacitor 811. Such an approach will be described in more detail later.

The power receiver thus transmits data symbols to the power transmitter by load modulating the power transfer signal with each data symbol being modulated by a sequence of modulation load values corresponding to a chip sequence of a set of modulation chip sequences. The modulation chip sequences are a combination of a first binary chip sequence and a second binary chip sequence and have at least three different chip values.

In the example of FIG. 8 the modulation chip sequences are dynamically generated but it will be appreciated that in many embodiments they may be predetermined and e.g. stored in the data transmitter 509 with the appropriate modulation chip sequence for a given data symbol being retrieved when this data symbol is to be transmitted.

Figure 9:
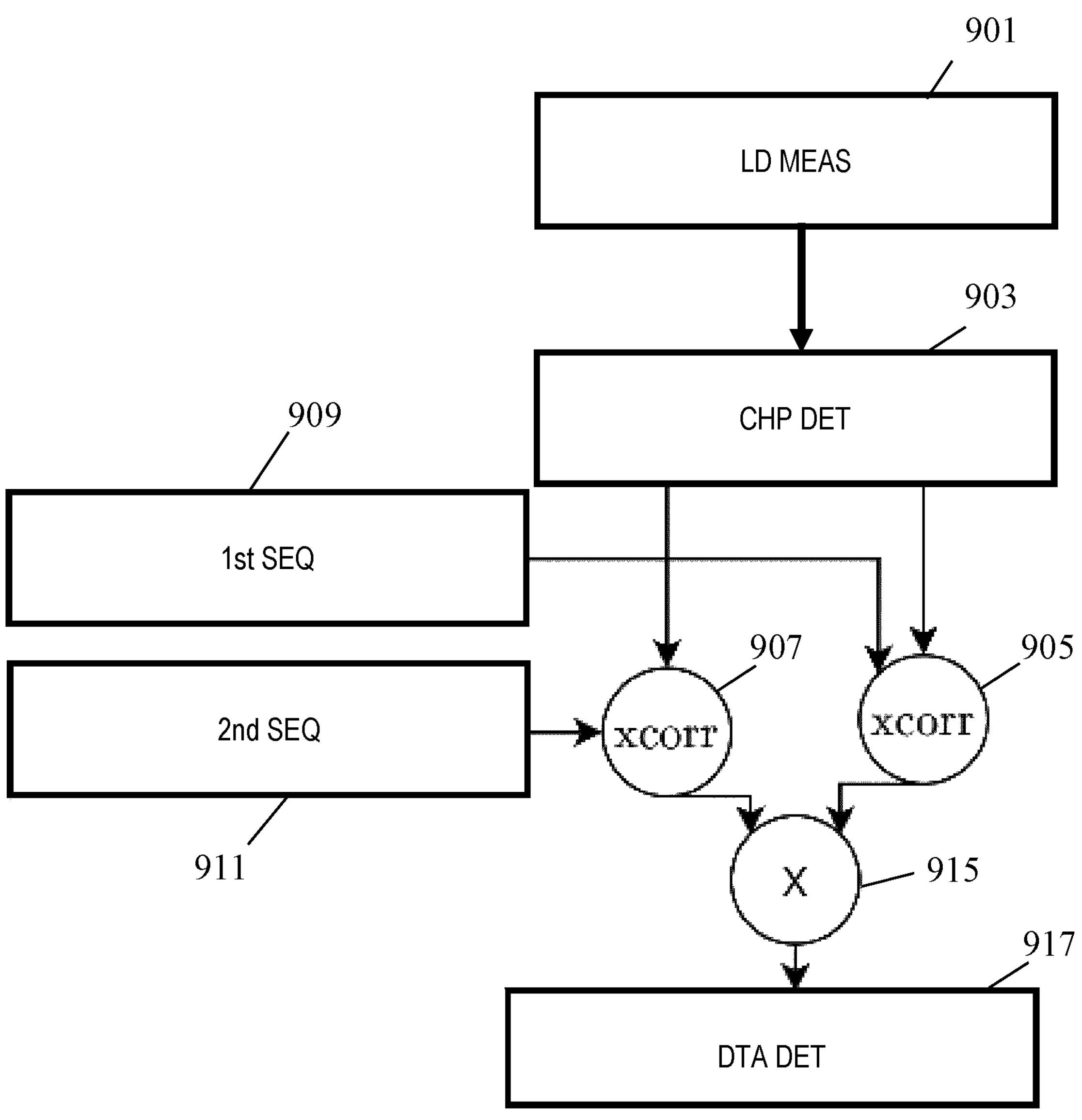
FIG. 9 illustrates an example of elements of a power transmitter in accordance with some embodiments of the invention.

FIG. 9 illustrates elements of the data receiver 207 of the power transmitter in accordance with some exemplary embodiments of the invention.

The data receiver 207 comprises a load measurer 901 which is arranged to measure a load of the power transfer signal to determine measured load values for the power transfer signal. The measured load values may be indicative of a loading of the power transfer signal by the power receiver, and thus may be indicative of the modulation load applied to the power transfer signal by the power receiver 105.

The load measurer 901 is coupled to a chip determiner circuit 903 which is arranged to determine a received chip sequence from the measured load values. The received chip sequence may specifically be a sequence of binary chip values corresponding to the estimated chip values derived from the load measurements. The received chip sequence may in some embodiments be soft decision values indicative of not only a chip data value but also of a confidence of this chip data value. The received chip sequence is thus determined from the load variations determined by measuring a load of the power transfer signal.

The chip determiner circuit 903 is coupled to a first and second correlator 905, 907 which are fed the received chip sequence from the chip determiner circuit 903. The first correlator 905 is coupled to a first correlation chip sequence source 909 which feeds the first binary sequence to the first correlator 905. Similarly, the second correlator 907 is coupled to a second correlation chip sequence source 911 which feeds the second binary sequence to the second correlator 907. The first and second binary sequences used by the data receiver 207 and the correlators 905, 907 are the same as the first and second binary sequences that are used by the data transmitter 509 of the power receiver, i.e. the combination of which forms the modulation chip sequence. The data receiver 207 thus stores local replica of the first and second binary sequences and correlates both of these with the received chip sequence to generate respectively a first and second correlation value. The data receiver 207 accordingly generates a first and second correlation value correspondingly to the correlation between the received chip sequence and the two binary sequences.

The correlators 905, 907 are coupled to a combiner 915 which is fed the first and second correlation values. The combiner 915 is arranged to generate a combined correlation value as a function of the first correlation value and the second correlation value. The function may specifically be a monotonically increasing function of both the first correlation value and of the second correlation values. The function may be linear or may in some cases be non-linear with respect to the first and/or second correlation value. In many embodiments, the combiner is arranged to combine the two part correlation values from the first and second correlators 905, 907 by multiplying these together.

The combiner 915 is coupled to a detector 917 which is arranged to determine the received data symbol values from the combined correlation value.

The detector 917 is arranged to determine data symbols received from the power receiver in response to the combined correlation value resulting from the correlations with the stored first and second binary chip sequences (at least one of which is different for different symbols). Specifically, in some embodiments, the load detector 917 may perform the correlation operation for all possible data symbols by selecting the first and second binary chip sequences for each data symbol and determining a corresponding combined correlation value. In cases, such as the described binary case where some sequences are the inverse of each other, only one combined correlation value may be determined with the sign of this value reflecting which of the two possible inverse modulation chip sequence is most likely to have been received (and thus which binary value is most likely to have been received).

The detector 917 may then determine the data symbol as one linked with the first and second binary chip sequences for which the associated combined correlation value is sufficiently high for a given threshold to be exceeded. The threshold may in many embodiments be an adaptive threshold, for example the threshold may be set dependent on correlation values with other symbols. As a specific example, the threshold may be set as the value of the next highest correlation value (e.g. subject to a minimum threshold value) resulting in the data symbol being selected as the one for which the correlation value is highest (e.g. subject to it exceeding the minimum threshold value).

Thus, the power receiver is capable of transmitting data to the power transmitter using load modulation with relatively long chip sequences for each data symbol, and the power transmitter may be arranged to receive this communication. The communication is based on using a modulation chip sequence for a given data symbol which is a combination of two binary sequences. The data receiver 207 is arranged to determine the received symbol by a combination of two correlations with the two binary sequences rather than directly correlating with the modulation chip sequence.

The approach may provide a substantially improved communication and operation in many embodiments. In particular, a substantially improved communication performance and reliability, and especially the symbol signal to noise ratio may be increased substantially. The approach is particularly advantageous in addressing self-interference where the interference is correlated with the load modulation itself. The approach may allow the modulation depth, and specifically the modulation load variations relative to the power transfer signal level/power transfer level, to be reduced substantially. This may reduce and mitigate many of the disadvantages of using load modulation and may e.g. reduce electromagnetic interference, reduce electrical noise, reduce mechanical noise, prevent or mitigate spurious oscillations etc.

In some embodiments, each chip may be represented by a constant modulation level, such as specifically a constant modulation load. In such embodiments, the modulation load only changes between chips. However, in some embodiments, each chip may be modulated/represented as a differential or load transition parameter. For example, in many embodiments, a first chip value (say −1) may be represented by a chip comprising a modulation load change in a first direction (e.g. increasing or decreasing load), a second chip value (say +1) may be represented by a chip comprising a modulation load change in a second direction (e.g. increasing or decreasing load being the opposite of the transition for the first chip value), and with a third chip value (say 0) being represented by no modulation load transitions occurring within a chip interval.

Such an approach may facilitate and/or improve the determination of the received chip values. For example, using an approach of constant modulation chip levels, the chip values may be detected by comparing measured load values to a threshold. For example, the load measurer 901 may be arranged to measure the load once per chip value, i.e. the load measurement values may be load measurement samples generated with one sample per chip.

For example, the load value of the drive signal (e.g. the current and/or power) may be measured and sampled at time intervals corresponding to the chip intervals during a time when a message is (expected to be) received from the power receiver. Thus, a received chip sequence is generated from the sampling of the signal(s) of the output circuit.

However, typically, the load variations caused by load modulation are relatively small which makes it difficult to detect the chip values accurately. Further, as the specific operating conditions tend to vary substantially, a fixed, predetermined threshold is typically not ideal or possibly even feasible. Rather, a suitable threshold may be determined based on the signal conditions and in particular a threshold may be derived to correspond to the average modulation load level.

Figure 12:
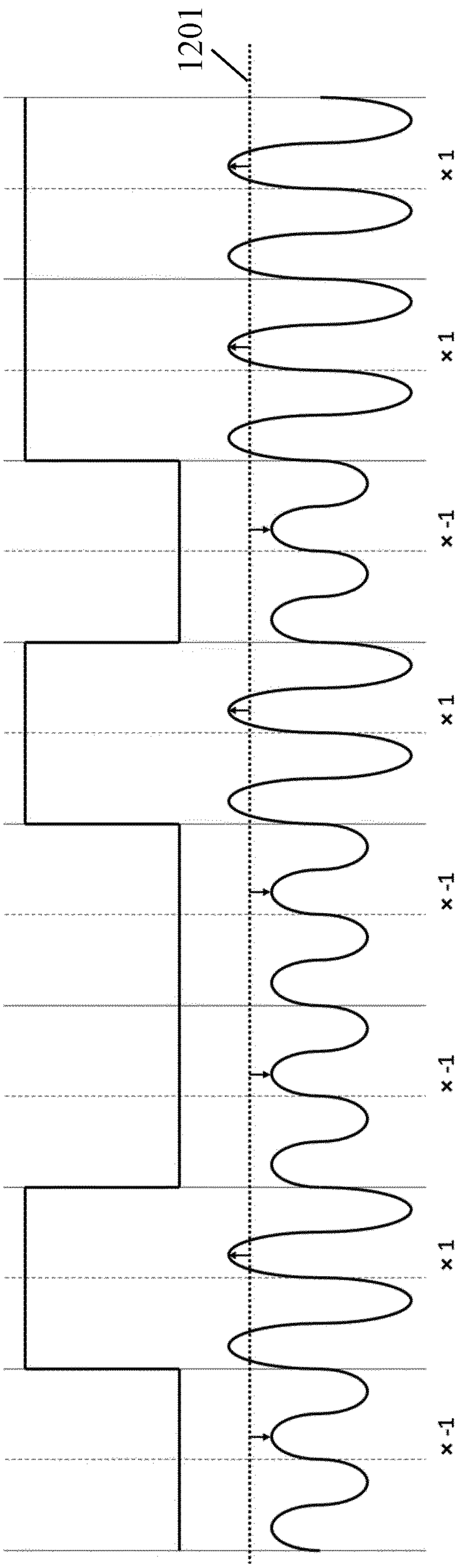
FIG. 12 illustrates an example of simulation results for load modulation communication in a wireless power transfer system.

FIG. 12 illustrates an example of how a power transfer signal could be load modulated by chips of a chip sequence. In this example, the modulation is synchronized to the power transfer signal at a rate of one chip per two power signal cycles. The arrows in FIG. 12 indicate times for which the load of the power transfer signal is measured/sampled. The sampling is synchronized with the power transfer signal and one sample is generated for each chip.

In order to determine the (binary) chip value, the sampled load values are compared to an average level 1201. In the specific example, the load of the power transfer signal is determined as the peak cycle value of the measured signal (which specifically may be a current, voltage, phase, or power of the power transfer signal), and the sampling is synchronized with the peak of the power transfer signal. Further, the average level 1201 of the peak cycle values is first determined, and the chip values then are determined based on whether the measured sample value is above or below the average level 1201. For a three level modulation chip sequence, the load values could be divided into three intervals using two thresholds (and thus with e.g. a −1 level being determined if the measured value is below a lowest threshold, a +1 level being determined if the measured value is above a highest threshold, and a 0 being determined if the measured value is between the thresholds).

However, whereas such an approach may provide a very useful communication link in many situations, it may in some cases be sensitive to noise, errors, etc and it may sometimes result in a bit error rate which is higher than preferred. Specifically, for the approach described with reference to FIG. 12, it is important to determine the average level with appropriate accuracy. Deviations and errors may have an impact not only on the individual chip values, but also on the correlation result used to determine the data symbol itself. It may result in reduced peak values, strong sidelobes to the peaks, or even in peaks with opposite signs, etc. It may accordingly result in substantial bit errors.

In some embodiments, modulation of the chip levels may be based on load transitions within a chip duration. This may in many scenarios provide improved performance and/or facilitated operation. Rather than requiring the determination of an accurate average level, the approach may effectively embed the reference level into the modulation format itself. It may further provide a higher number of chip modulation levels, including providing efficient support for three (or e.g. four) level modulation chip sequences.

In the approach, each chip is divided into two (or more) load time intervals that may have different modulation loads. Thus, each chip may comprise at least two load time intervals with potentially different modulation loads and thus chips may be represented by at least two different modulation loads, and specifically each chip is represented by a pattern of load modulation loads that may be different for at least two load time intervals for at least some chip values. Further, the pattern of different modulation loads is specific to a given chip value. Thus, different chip values are linked to different patterns of load modulation. In this approach, rather than considering the entire chip time interval as being one (constant) load time interval, the chip time interval is divided into multiple load time intervals (with the modulation load in the example being constant within these).

In cases where the system may use binary modulation loads, i.e. the modulation load applied by the power receiver may have one of two possible load values. Such an approach is advantageous by allowing a low complexity implementation and facilitated operation. It typically facilitates the load modulation operations for both transmitting and receiving functions and tends to lead to efficient performance and reliable communication. It may further allow more chip values (e.g. three or four values) to be effectively represented while only using binary modulation loads.

As an example, the data transmitter 509 may typically control the switching in or out of a modulation load component, such as a capacitor or resistor, and thus may apply to different modulation loads.

In many embodiments, a binary load modulation may thus be used while still allowing non-binary chip values. In many embodiments, the chip time interval may be divided into two load time intervals with one binary load value being applied in one load time interval and the other load value being applied in the other load time interval. Two binary chip values can then be determined to correspond to the two possible patterns/orders of the two modulation loads being allocated to the two load time intervals. Specifically, in some embodiments, each transmitted chip may be divided into two halves with opposite modulation loads in each of those halves, and with the order of these (i.e. which modulation load is allocated to the first half) depending on the binary chip value.

Figure 13:
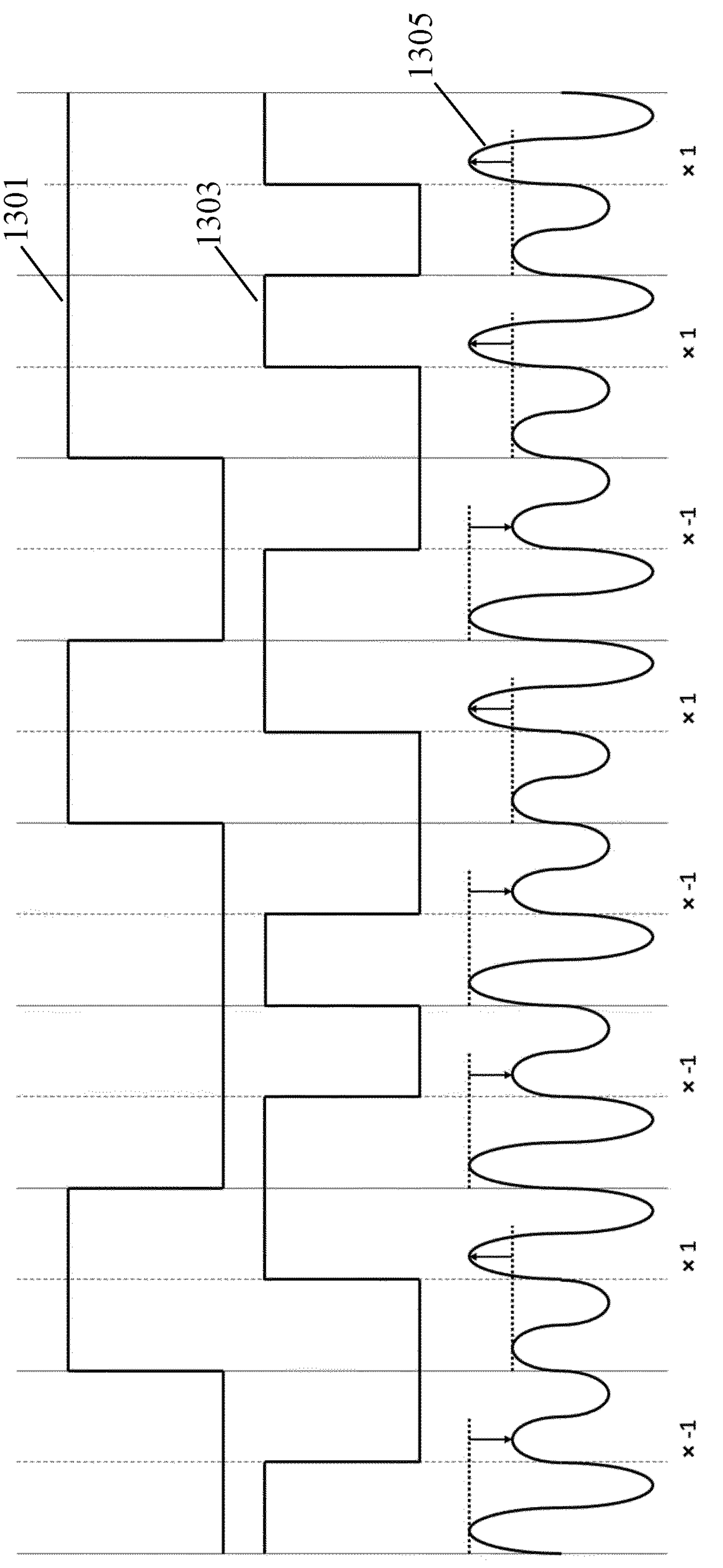
FIG. 13 illustrates an example of a load communication in a wireless power transfer system in accordance with some embodiments of the invention.

An example of this is shown in FIG. 13 in which the top signal 1301 illustrates the chip sequence and chip values, and the middle signal 1303 illustrates the modulation load value variation. As illustrated, each chip is divided into two load time intervals with one e.g. having a high(er) modulation load and one having a low(er) modulation load. Whether the first load time interval of a given chip is the high(er) or low(er) modulation load depends on the chip value.

Specifically, signal 1301 shows the chips in the sequence and signal 1303 shows the switching of the modulation load by the data transmitter 509, i.e. it shows modulation load levels in the load time intervals. In the example, the data transmitter 509 switches the modulation load off (or low) in the first half and on (or high) in the second half for a "1" chip. Conversely, for a "−1" chip, the data transmitter 509 switches the modulation load on (or high) in the first half and off (or low) in the second half.

In many embodiments, such binary chip value may be extended by e.g. including a third chip value which is represented by the modulation load not changing in the chip interval, i.e. the modulation load is the same in the two load time intervals. In this way, additional chip values and higher order chip value modulation can be achieved.

Such an approach may thus not only allow determination of the chip values without requiring accurate thresholds but may also efficiently support modulation chip sequences with three or more possible chip values.

In the approach, the power transmitter is arranged to determine the data symbols by considering the relative load variations within the chips. Specifically, the load measurer 901 is arranged to measure the load of the power transfer signal to determine measured load values for the load time intervals. A measured load value/sample may be determined for each load time interval.

The chip determiner circuit 903 is arranged to determine the individual chip value in response to the difference between measured load values for at least two modulation load time intervals of the individual chip.

Specifically, the chip determiner circuit 903 may be arranged to determine the difference between two load time intervals, for example the load value for the first load time interval may be subtracted from the load value for the second load time interval. Depending on the result, the chip determiner circuit 903 may then proceed to determine the chip value as a function of the difference.

In FIG. 13, signal 1305 represents the measurements of the drive signal/power transfer signal. As can be seen, each chip comprises a load time interval with a high signal level (corresponding to a low modulation load) and one with a low signal level (corresponding to a high low modulation load), with the order of these depending on the chip value. In the example, an increased signal level (the level for the second load time interval being higher than for the first load time interval) is decoded as a chip value of "1" and a decreased signal level (the level for the first load time interval being higher than for the second load time interval) is decoded as a "−1". Further, if the difference between the signal levels in the two time intervals is below a given (e.g. predetermined) threshold, the chip value is set to 0.

The amplitude/level of the drive signal/power transfer signal in the first half of the chip (the first load time interval) can serve as the reference level for the measurements made in the second half of the chip (the second load time interval), or vice versa. The reference for the load modulation determination of the individual chip is thus directly embedded within the modulation format. The determination of the chip values can thus be made without requiring an average or reference level to be estimated or determined. Rather, a local intra-chip relative measurement and comparison can be used to determine the chip values.

The chip values are then used to generate the received chip sequence which is compared with the first and second binary chip sequences.

The approach may provide substantially improved performance and more reliable data communication.

In many embodiments, the chip determiner circuit 903 may be arranged to determine the chip values as binary chip values. The chip determiner circuit 903 may specifically be arranged to select the binary chip value to correspond to the sign of the difference between the load values/measures in the load time intervals of a chip. For example, if the signal peak sample is higher in the first load time interval than in the second load time interval, then the chip value may be determined as a "1" whereas if the if the signal peak sample is lower in the first load time interval than in the second load time interval, then the chip value may be determined as a "−1" (or vice versa). In many embodiments, the chip determiner circuit 903 may determine the difference between the load values in the load time intervals and set the binary value to correspond to the sign. However, if the absolute difference is below a threshold, the chip value may be determined as a "0".

Such an approach may provide a low complexity yet accurate determination of the received chip sequence which is suitable for low complexity correlation. For example, it may allow a binary correlation operation which is substantially lower complexity and resource demanding as multiplications can be replaced by simple binary operations (e.g. a simple binary exor operation). For a "0" value the correlation may simply be skipped.

In some embodiments, the chip determiner circuit 903 may be arranged to determine the received chip sequence to comprise soft-decision chip values. Rather than a simple symbol value, the generated chip values may also indicate the reliability or confidence level for the chip value.

For example, the magnitude of the difference may be considered in addition to the sign. For example, a given nominal case with no noise, a nominal magnitude of the difference may be determined (or e.g. the nominal difference may be determined by averaging/low filtering the differences for a plurality, and typically many, chips). The deviation of the difference for a specific chip to this difference may accordingly indicate the probability of the decision being a correct value. However, in most embodiments, the magnitude of the difference may simply indicate the confidence or reliability, and the larger the measured difference, the more likely the sign is to be correct, i.e. the larger the difference magnitude the more confidence in the chip value.

The correlation with the chip sequences of the set of chip sequences may be performed in response to the soft-decision chip values, and specifically the correlation may be performed using the soft decision values.

For example, in some embodiments, the correlation may be performed as a binary exor-operation between stored binary chip sequences and a received chip sequence formed by the signs of the determined differences with the result of each exor operation being weighted (e.g. multiplied) by the magnitude of the difference (possibly relative to a nominal difference) prior to summation of the results. As another example, the stored chip sequences may be represented by chip values of +1 and −1 and these values may directly be multiplied by the corresponding chip load differences (corresponding to the received chip sequence). The correlation may then be determined by summing the multiplication results.

Such approaches may require more complex operations but may in many embodiments and scenarios provide improved performance and specifically may allow more accurate data symbol detection.

In many embodiments the chip determiner 211 is arranged to determine the received chip sequence as a binary chip sequence, and specifically to determine the received chip sequence as a binary sequence even if the modulation chip sequence is a three or higher level/value sequence. The chip determiner 211 may specifically determine the received chip sequence as a binary chip sequence even if the modulation chip sequence is a three or more level sequence. For example, even if the modulation chip sequence is represented by three possible levels (−1,0,1) for each chip, the chip determiner 211 may be arranged to simply determine the chips of the received chip sequence to have binary values (−1,1). The binary received chip sequence is then fed to the correlators for correlation with the first binary chip sequence and the second binary chip sequence respectively. In this case, a low complexity correlation and operation can be performed. Further, this can be achieved while maintaining reliable performance and with improved/reliable data symbol detection.

In some embodiments, the chip determiner 211 may determine the received chip sequence to have the same values as are possible/allowable for the modulation chip sequence. For example, for a three level modulation chip sequence, the received chip sequence may be determined as a three level modulation chip sequence. For example, the chip determiner 211 may determine the most likely chip value by selecting the possible value that is closest to a measured value. In such a case, the correlation may still be performed with the first and second binary sequences, i.e. the correlation may be between a three (or higher) level received chip sequence and two binary sequences. The approach may in some cases provide improved performance and an improved data symbol detection may be achieved. Further, this may in many cases be achieved with low complexity and resource usage as the correlation with the binary sequences may be effectively implemented, e.g. using simple logical circuit comparing values and not requiring explicit multiplications.

In some embodiments, the chip determiner 211 may determine the chip values as soft decision values. Such chip values may include a representation of the likelihood of the detected chip value being correct. The uncertainty indication may be considered in the correlation and specifically lower uncertainty indications may result in a higher weight for that chip to the correlation value than for a higher uncertainty indication.

For example, as described above, the chip value for a three-level modulation chip sequence with the three levels may be represented by respectively a load change in one direction, a load change in the other direction, or no load change. The chip determiner 211 may be arranged to determine the chip value by determining the difference between load values in the first and second half of the chip. For a chip determiner 211 determining the received chip sequence as a binary chip value, the chip value may be set to the sign of the difference. For a three level received chip sequence, the chip determiner 211 may determine the chip value as the sign unless the absolute value is below a threshold in which case the chip level may be set to a third value, such as a zero value. For a soft decision chip determiner 211, the chip value may simply be set to the difference value (e.g. normalized with respect to a suitable reference level).

In many embodiments, the chip determiner 211 may determine the received chip sequence as a binary received chip sequence. In such a case, a first binary value for the received chip sequence may represent a first chip value of the modulation chip sequence, and a second binary value for the received chip sequence may represent a second chip value of the modulation chip sequence. For a modulation chip sequence having at least three possible values, the chip determiner 211 may be arranged to determine a binary value as the first binary value or the second binary value with probabilities that differ by no more than 10%, or even 5%. The determination may depend on noise/interference and the requirement may be met for symmetric noise and interference. Indeed, in most embodiments, the chip determiner 211 may be arranged to determine a binary value for a binary received chip sequence with substantially equal probability for symmetric noise for at least one chip level of the modulation chip sequence.

In many embodiments, the chip determiner 211 may be arranged to implement a symmetric decision between a first and second chip value for the received chip sequence for at least one chip value of the modulation chip sequence.

As a specific example, the modulation chip sequence may be arranged to use the chip values −1, 0, 1 with these being load modulated by modulation loads where the modulation load for value 0 is midway between the modulation loads for −1 and +1. The chip determiner 211 may be arranged to determine the received chip sequence as a binary sequence with respectively the values −1 and +1. In that case, the binary chip value for a modulation chip sequence chip value of 0 may be determined as a −1 or +1 with equal probability.

As another example, if differential/load transition modulation of the chip values is used, the chip determiner 211 may determine the load difference between the first and second time intervals and then determine the chip value as the sign of this difference. For a chip value of the modulation chip sequence (0) where no load transition is introduced, the sign of the difference is random with 50% change of either value, and thus the probability of the received chip sequence being determined as either binary value is 50%.

In many embodiments, the data receiver 207 is arranged such that a contribution to the first and/or second correlation values for at least one chip value of the modulation chip sequence is less than 10%, (or even less than 5%, or 1%) of the contributions for at least one other chip value of the modulation chip sequence. The contributions may be contributions when no noise or interference is present, or may e.g. be considered as average contributions in the presence of symmetric (with respect to the chip values) noise.

For example, when the binary chip values of the received chip sequence are determined as the first or second binary value with equal probability for one modulation chip sequence chip value (0), the average contribution to the first and second correlations will be zero. In some embodiments, the data receiver 207 may e.g. be arranged to detect that the third chip level is received and explicitly disregard it in the correlation. For example, for a load transition approach, differences with an absolute level below a given threshold may be ignored or set to zero.

Such approaches may provide improved operation and typically a more accurate data detection in the presence of noise. The approaches may exploit that correlation to difference chip sequences combined into the modulation chip sequence may reflect different correlation properties that can combine to provide an overall improved performance.

Figure 14:
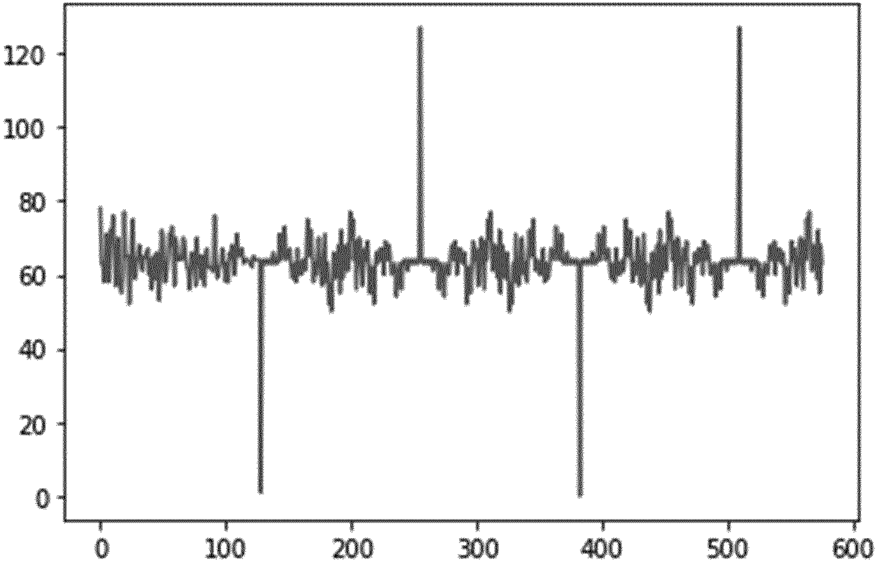
FIG. 14 illustrates an example of simulation results for load modulation communication in a wireless power transfer system.
Figure 14:
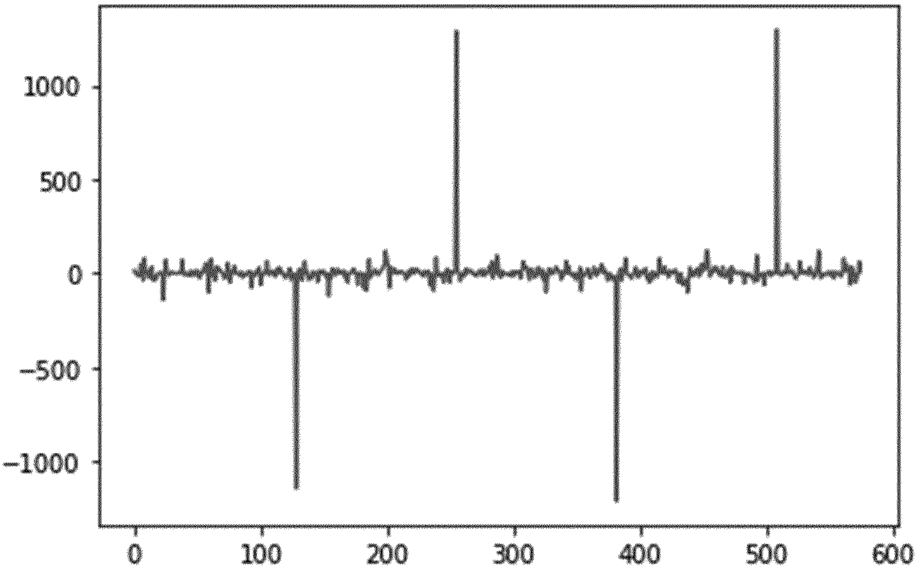
Figure 15:
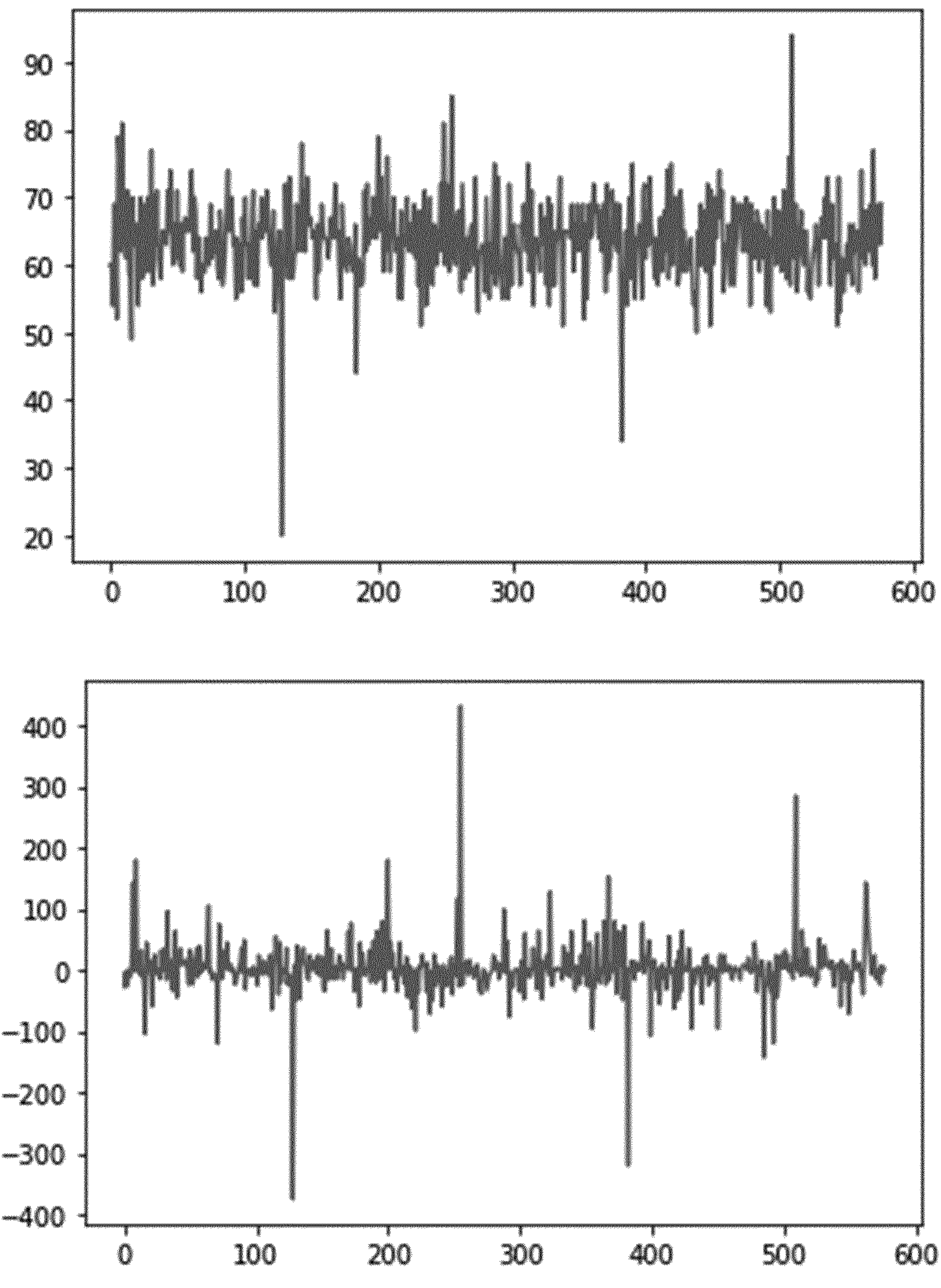
FIG. 15 illustrates an example of simulation results for load modulation communication in a wireless power transfer system.

The approach may typically provide improved communication channel resilience against stochastic detection errors (false correlation peaks) and improved detectability of the signal under heavy interference (e.g., spurious oscillations in the system). FIG. 14 illustrates correlation outputs for a single correlation if a measured load transition/difference and a single full chip sequence in comparison to the combined correlation value from two correlations with the first and second sequences. It is observable that the ratio of average correlation peak amplitude to an average output of the correlator is around 16 db in the first case and around 36 db in the second case. Another example is illustrated in FIG. 15 where noise and interference are further considered. As can be seen in the example, the correlation peak around sample 257 is clearly detectable using the described approach but not using a simple single correlation.

The above description has focused on a scenario where the modulation chip sequence is a non-binary sequence where chips may be one of three or more different levels. However, whereas such an approach may provide advantageous operation in many embodiments, it is also possible in some embodiments to determine the modulation chip sequence itself as a binary sequence.

In the above described approach, a third level was selected for cases where the first and second binary sequence had different bit values. The third level was by the data receiver 207 determined as a binary value with equal probability thereby reducing the average contribution to the correlations to ideally zero. However, in some embodiments, a selection of a binary value may be performed at the data transmitter side. For example, the chip values for chips where the first and second binary sequences have different values may be selected to alternate between being set to the value of the first binary sequence and the value of the second sequence. In such cases, the contribution of these values to the first correlation value and the second correlation value may be reduced to typically insignificant values (and possibly even to an average zero contribution). Further, such an approach may maintain a balanced impact on the two individual correlations which in many cases provide improved detection accuracy.

It will be appreciated that other approaches for selecting a binary value in case of differing values for the first and second binary values may be used such as e.g. randomly select from either sequence, alternately select from either sequence, use the index into the sequence to select between either sequence, etc.

The chip time intervals may typically be synchronized with the cycles of the power transfer signal. Similarly, the load time intervals may typically be synchronized with the cycles of the power transfer signal. In many embodiments, the system may be arranged to synchronize the load modulation communication (and specifically the chip time intervals and the load time intervals) to the power transfer signal/drive signal.

In many embodiments, the data transmitter 509 may specifically be arranged to synchronize the load modulation of the chip sequence and load time intervals to the power transfer signal. The power transfer signal has an operating frequency which is typically in the range of 10 kHz-500 kHz and for Qi is often around 100 kHz. The data transmitter 509 may adapt the timing of the chip time intervals and the load time intervals to be synchronized to the oscillations and periods of the power transfer signal. For example, in many embodiments, the data transmitter 509 may use a chip duration/time interval and/or a load time interval (duration) which is a multiple of the power transfer signal period. Thus, each load time interval may have a duration that is a multiple of the period time of the power transfer signal, i.e. the duration of the load time intervals may be N*T where N is an integer and T is the duration of a period of the power transfer signal/drive signal.

In many embodiments, the data transmitter 509 may not only synchronize the duration of the load time intervals to the durations of the periods of the power transfer signal but may also time the start and/or stop timings of the load time intervals to the timing of the power transfer signal. Specifically, the transition times between modulation levels of the load time intervals may be synchronized to occur at zero crossings of the power transfer signal, or e.g. with a fixed offset relative to zero crossings of the power transfer signal. It will be appreciated that the synchronization may be based on the timing of the signal inducted in the receiver coil 107 by the power transfer signal.

Similarly, the power transmitter may be arranged to generate the received chip sequence from samples/measurements of the loading of the power transfer signal/drive signal (possibly after matched filtering being applied).

The load measurer 901 may specifically sample a signal of the output circuit that corresponds to the power transfer signal, such as a current and/or power of the drive signal, a relative phase between current and voltage of the drive signal, a current through the transmitter coil 103 etc. The load modulation data receiver 207 may then generate the received chip sequence from the difference between such load measures at given sampling times belonging to different load time intervals of a given chip.

In many embodiments, the load measurer 901 may be arranged to synchronize the sampling to the power transfer signal, and specifically this may be achieved by synchronizing it to the drive signal.

In many embodiments, the synchronization may be of the sampling such that e.g. one sample is made per load time interval (possibly after matched filtering). Especially, if the load time interval duration is equal to N times the period of the power transfer signal, the sampling may also be synchronized to be once every N times. Thus, in many embodiments, the synchronization may be such that the sampling rate is equal to the load time interval frequency of the load modulation.

In some embodiments, the sampling may be a two stage process where a number of samples are generated at a higher frequency and then decimated to given sample rate. For example, for a load time interval duration of ten times the period of the power transfer signal, the sampler may take one sample every period. An averaging filter may then add the last ten samples, i.e. it may be a square window FIR filter that sums the ten most recent samples (with equal weights). The output of the sampling may then be the sampled output of this filter, such as specifically the output of every tenth period which coincides with the filter being a summation of the ten periods falling within a single chip. Thus, effectively the sampling at the synchronized time instants may be achieved by a suitably synchronized decimation at the output of the filter.

However, in most embodiments, only a single sampling/measurement is performed per load time interval. In such a situation the timing of the sampling may for each sample be synchronized to occur at the peak of a cycle of the signal/parameter being measured. If the load time interval and sampling is synchronized to the power transfer signal cycles, this may simply be achieved by sampling/measuring at the center time of the load time interval.

In many embodiments, the operating frequency of the drive signal and the power transfer signal may thus be an integer multiple of the sampling rate of the sampling of the signal of the output circuit and/or an integer multiple of a load time interval and chip frequency of the load modulation. The multiple may specifically be one. Indeed, in many embodiments, the integer multiple is advantageously relatively low in order to allow efficient communication and a higher data rate. In many embodiments, the integer advantageously does not exceed 1, 3, 5, 10, or 20.

Synchronization of the load modulation to the power transfer signal may in many practical implementations allow an increase of the chip rate and/or bit rate because it enables a reduction of the amount of sampling the power transmitter has to perform. In the extreme case where the chip frequency is the same as the power transfer signal frequency, the power receiver may change the load according to the chip sequence every cycle of the power transfer signal, and for two load time intervals, the load may be changed every half cycle of the power transfer signal. Alternatively, the power receiver may change the load according to the chip sequence every N-th cycle of the power signal, reducing the chip frequency by a factor N.

Synchronous modulation cases modulation detection at the power transmitter side by enabling this to apply a synchronous sampling technique and correlating the detected signal to the modulation sequence after that step. The approach may typically facilitate implementation substantially while achieving an efficient communication.

The length of the chip sequences may be selected to the specific preferences and requirements of the individual embodiment and may be selected to provide a suitable compromise between communication reliability and performance (e.g. bit rate), data rate, bandwidth, modulation depth and associated disadvantages etc. In most embodiments, a length of no less than 8 and/or no more than 128 chips will provide suitable and advantageous performance for wireless power transfer systems, such as specifically for Qi systems.

The specific chip sequences and patterns used may depend on the preferences and requirements of the individual embodiment. Typically, the sequences are selected to provide good correlation properties, and specifically the set of chip sequences is selected to consist of sequences with high autocorrelation values and low cross-correlation values. In many embodiments, chip sequences may be selected as maximum length sequences. For example, in many embodiments, chip sequences may be selected as maximum length sequences generated from a polynomial, the polynomial order chosen by the power receiver in accordance with a desired/selected modulation depth and desired communication speed. Specifically, pseudo noise sequences developed for, and used in, direct sequence spread spectrum communication and code division multiple access systems may tend to also be suitable for the described approach.

As previously mentioned, the set of sequences may comprise mirror image or inverted chip sequences, i.e. for a given binary chip sequence, the set of chip sequences may also include the chip sequence for which all chips have the complementary value. For example, if the load values are represented by 1 and −1, the set of chip sequences may for each chip sequence also include the chip sequence resulting from a multiplication by −1 (equivalent to swapping between 0 and 1 for all chips for a chip sequence represented by the values of 1 and 0). Indeed, in some embodiments, the set of chip sequences may comprise only a chip sequence and the inverted chip sequence. It will be appreciated that in such embodiments, only a single representation needs to be stored to represent a pair of a chip sequence and the inverted chip sequence.

Such an approach may be particularly suitable for many applications and may result in good performance and low complexity. For example, a single correlation between a received chip sequence and a reference chip sequence can provide a correlation value for both the reference chip sequence and for the inverse chip sequence. Indeed, if there is no noise, the correlation value for one of the reference chip sequences may be +1 and the correlation value for the inverse reference chip sequence will then by −1. Thus, a single correlation value applicable to two symbol values/sequences can be determined and directly be used to select between the two symbols.

It will be appreciated that the approach of using inverted reference chip sequences can be considered equal to a multiplication of the binary data symbol and a single reference chip sequence (using the values of 1 and −1 to represent the binary values).

In the described examples for load transition modulation, each chip has been divided into two load time intervals with different modulation loads. This may allow an efficient operation with improved performance. It may specifically allow low complexity and low resource usage while still providing substantially improved performance in many embodiments.

However, in some embodiments, each chip may be divided into three or more load time intervals that have different modulation loads.

For example, in some embodiments, each chip may be divided into three load time intervals with the load level for the first load time interval being a reference level. The load in the second load time interval may be higher than the reference level and in the third load time interval lower than the reference level for a first binary chip value. For the other binary value, the load may be lower than the reference level in the second load time interval and may be higher than the reference level in the third load time interval. The chip determiner circuit 903 may then determine a (e.g. binary) chip value may detecting whether the two load changes are present and in which direction the changes are in the individual load time intervals. Such an approach may allow improved chip value determination in different scenarios. For example, it may reduce sensitivity to the direction of load change.

In many embodiments, each load time interval may have a duration of a single cycle of the power transfer signal. This may be advantageous in many embodiments as it may for example reduce the minimum time required per chip thereby allowing a higher data rate or e.g. longer chip sequences to be used.

However, in some embodiments, each load time interval may have a duration of a plurality cycles of the power transfer signal. In some embodiments, each load time interval may have a duration of no less than two, three, five, or ten cycles of the power transfer signal. This may be advantageous in many scenarios by e.g. facilitating or improving the measurement process. For example, the synchronization to sample peak values of the power transfer signal/drive signal may be relatively easy to achieve but the synchronization between chips and the set of cycles that correspond to each load time intervals of a chip may be more difficult. For example, the alignment between cycle peaks and load time intervals of individual chips may be disrupted resulting in the power transmitter allocating the load measurement to wrong load time intervals/chips.

For example, the determination of the next power transfer signal cycle may in many embodiments be determined by detecting zero-crossings of the power transfer signal. However, due to noise etc., it is possible that a false additional zero-crossing may be detected or (less likely) that a zero crossing may be missed. For a case where each load time interval has a duration of one power transfer signal cycle, this may result in a misalignment between the cycles/measurements and the load time intervals of the individual chips resulting in detection errors.

However, by having a load time interval that is a duration of a plurality cycles of the power transfer signal, such errors may be mitigated.

A modulation load may be a load component of the loading of the power transfer signal/drive signal caused by/depending on/varying with the load modulation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent clam but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:

an output circuit comprising a transmitter coil, wherein the transmitter coil is arranged to generate a power transfer signal in response to a drive signal applied to the output circuit;

a driver circuit, wherein the driver circuit is arranged to generate the drive signal; and a data receiver circuit, wherein the data receiver circuit is arranged to receive a plurality of load modulation data symbols modulated by at least one modulation chip sequence, wherein at least a first modulation chip sequence of the at least one modulation chip sequences is a combination of a first binary chip sequence and a second binary chip sequence;

wherein the data receiver circuit, comprises:

a load measurer circuit, wherein the load measurer circuit is arranged to measure loading of the power transfer signal so as to generate measured load values;

a chip determiner circuit, wherein the chip determiner circuit is arranged to determine a received chip sequence from the measured load values;

a first correlator circuit, wherein the first correlator circuit is arranged to correlate the received chip sequence with the first binary chip sequence so as to generate a first correlation value;

a second correlator circuit, wherein the second correlator circuit is arranged to correlate the received chip sequence with the second binary chip sequence so as to generate a second correlation value;

a combiner circuit, wherein the combiner circuit is arranged to generate a combined correlation value based on the first correlation value and the second correlation value; and a detector circuit, wherein the detector circuit is arranged to detect a received data symbol value in response to the combined correlation value.

2. The power transmitter of claim 1, wherein the first modulation chip sequence comprises at least three different chip values.

3. The power transmitter of claim 1,
wherein at least two chip values of the first modulation chip sequence are represented by modulation load changes,
wherein the modulation load changes are different for the at least two chip values,
wherein the chip determiner circuit, is arranged to determine the received chip sequence based on the modulation load changes.

4. The power transmitter of claim 2,
wherein at least one chip time interval of the first modulation chip sequence is divided into at least two load time intervals,
wherein at least two chip values have different modulation loads for the at least two load time intervals,
wherein a pattern of modulation loads is different for different chip values of the at least two chip values,
wherein a third chip value of the at least three different chip values has a third modulation load in the at least two load time intervals,
wherein the load measurer circuit, is arranged to determine the measured load values as measured load values for load time intervals,
wherein the chip determiner circuit, is arranged to determine chip values for the received chip sequence in response to differences in measured load values for different load time intervals of each chip.

5. The power transmitter of claim 1, wherein the first modulation chip sequence comprises three different chip values.

6. The power transmitter of claim 5,
wherein the first modulation chip sequence has a first value for aligned chips of the first binary sequence and the second binary sequence,
wherein the first binary sequence and the second binary sequence have a first binary value,
wherein the first binary sequence and the second binary sequence have a second value for aligned chips of the first binary sequence and the second binary sequence,
wherein the first binary sequence and the second binary sequence have a second binary value,
wherein the first binary sequence and the second binary sequence have a third value for aligned chips of the first binary sequence and the second binary sequence having different aligned values.

7. The power transmitter of claim 1, wherein the chip determiner circuit, is arranged to determine the received chip sequence as a binary chip sequence.

8. The power transmitter of claim 7, wherein a contribution to the first correlation value for at least one chip value of the first modulation chip sequence is less than 10% of a contribution to the first correlation value for at least one other chip value of the modulation chip sequence.

9. The power transmitter of claim 1, wherein the combiner circuit is arranged to generate a combined correlation value in response to a mathematical product of the first correlation value and the second correlation value.

10. The power transmitter of claim 1,
wherein the chip determiner circuit, is arranged to determine chip values for the received chip sequence,
wherein the chip values are possible chip values for the first modulation chip sequence.

11. The power transmitter of claim 1, wherein a cross-correlation of the first binary sequence and the first modulation chip sequence is no less than two thirds of a length of the first binary sequence when the first binary sequence and the first modulation chip sequence are aligned, and no more than one third of the length of the first binary sequence when the first binary sequence and the first modulation chip sequence are not aligned.

12. A power receiver comprising:
an input circuit comprising a receiver coil, wherein the receiver coil is arranged to extract power from a power transfer signal;
a data transmitter circuit, wherein the data transmitter circuit is arranged to transmit a plurality of data symbols to the power transmitter by load modulating the power transfer signal,
wherein each data symbol of the plurality of data symbols is modulated by a sequence of modulation load values corresponding to a chip sequence of a plurality of modulation chip sequences,
wherein at least one chip sequences of the plurality of chip sequences is linked to a different data symbol value;
wherein at least one modulation chip sequence of the plurality of modulation chip sequences is a combination of a first binary chip sequence and a second binary chip sequence,
wherein the least one modulation chip sequence has at least three different chip values.

13. A method comprising:
generating a power transfer signal in response to a drive signal;
receiving a plurality of load modulation data symbols modulated by at least one modulation chip sequence, wherein at least a first modulation chip sequence of the at least one modulation chip sequences is a combination of a first binary chip sequence and a second binary chip sequence;
measuring loading of the power transfer signal so as to generate measured load values;
determining a received chip sequence from the measured load values;
correlating the received chip sequence with the first binary chip sequence so as to generate a first correlation value;
correlating the received chip sequence with the second binary chip sequence so as to generate a second correlation value;
generating a combined correlation value based on of the first correlation value and the second correlation value;
detecting a received data symbol value in response to the combined correlation value.

14. A method comprising:
extracting power from the power transfer signal;
transmitting a plurality of data symbols to the power transmitter by load modulating the power transfer signal,
wherein each data symbol of the plurality of data symbols is modulated by a sequence of modulation load values corresponding to a chip sequence of a plurality of modulation chip sequences,
wherein at least one chip sequences of the plurality of chip sequences is linked to a different data symbol value;
wherein at least one modulation chip sequence of plurality of modulation chip sequences is a combination of a first binary chip sequence and a second binary chip sequence,
wherein the least one modulation chip sequence has at least three different chip values.

15. A computer program stored on a non-transitory medium, wherein the computer program when executed on a processor performs the method as claimed in claim 13.

16. The method of claim 13, wherein the first modulation chip sequence comprises at least three different chip values.

17. The method of claim 13, further comprising determining the received chip sequence based on modulation load changes, wherein at least two chip values of the first modulation chip sequence are represented by the modulation load changes, wherein the modulation load changes are different for the at least two chip values.

18. The method of claim 16, further comprising:

determining the measured load values as measured load values for load time intervals; and determining chip values for the received chip sequence in response to differences in measured load values for different load time intervals of each chip, wherein at least one chip time interval of the first modulation chip sequence is divided into at least two load time intervals, wherein at least two chip values have different modulation loads for the at least two load time intervals, wherein a pattern of modulation loads is different for different chip values of the at least two chip values, wherein a third chip value of the at least three different chip values has a third modulation load in the at least two load time intervals.

19. The method of claim 13, wherein the first modulation chip sequence comprises three different chip values.

20. The method of claim 19, wherein the first modulation chip sequence has a first value for aligned chips of the first binary sequence and the second binary sequence, wherein the first binary sequence and the second binary sequence have a first binary value, wherein the first binary sequence and the second binary sequence have a second value for aligned chips of the first binary sequence and the second binary sequence, wherein the first binary sequence and the second binary sequence have a second binary value, wherein the first binary sequence and the second binary sequence have a third value for aligned chips of the first binary sequence and the second binary sequence having different aligned values.

21. The method of claim 13, further comprising determining the received chip sequence as a binary chip sequence.

22. The method of claim 21, wherein a contribution to the first correlation value for at least one chip value of the first modulation chip sequence is less than 10% of a contribution to the first correlation value for at least one other chip value of the modulation chip sequence.

23. The method of claim 13, further comprising generating a combined correlation value in response to a mathematical product of the first correlation value and the second correlation value.

24. The method of claim 13, further comprising determining chip values for the received chip sequence, wherein the chip values are possible chip values for the first modulation chip sequence.

25. The method of claim 13, wherein a cross-correlation of the first binary sequence and the first modulation chip sequence is no less than two thirds of a length of the first binary sequence when the first binary sequence and the first modulation chip sequence are aligned, and no more than one third of the length of the first binary sequence when the first binary sequence and the first modulation chip sequence are not aligned.

26. A computer program stored on a non-transitory medium, wherein the computer program when executed on a processor performs the method as claimed in claim 14.

* * * * *